(12) United States Patent
Johnson et al.

(10) Patent No.: US 11,288,729 B1
(45) Date of Patent: Mar. 29, 2022

(54) PREDICTING ORDERS FROM BUYER BEHAVIOR

(71) Applicant: Block, Inc., San Francisco, CA (US)

(72) Inventors: Logan Johnson, San Francisco, CA (US); James F. Butts, III, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 16/537,356

(22) Filed: Aug. 9, 2019

Related U.S. Application Data

(63) Continuation of application No. 14/464,276, filed on Aug. 20, 2014, now Pat. No. 10,410,272.

(51) Int. Cl.
*G06Q 30/06* (2012.01)
*G06Q 20/20* (2012.01)
*G06Q 30/02* (2012.01)

(52) U.S. Cl.
CPC ......... *G06Q 30/0631* (2013.01); *G06Q 20/20* (2013.01); *G06Q 30/0204* (2013.01); *G06Q 30/0633* (2013.01)

(58) Field of Classification Search
None
See application file for complete search history.

(56) References Cited

U.S. PATENT DOCUMENTS

| | | |
|---|---|---|
| 6,026,375 A | 2/2000 | Hall et al. |
| 6,646,659 B1 | 11/2003 | Brown et al. |
| 6,839,682 B1 | 1/2005 | Blume et al. |
| 7,024,205 B1 | 4/2006 | Hose |
| 7,324,958 B2 | 1/2008 | Miyazaki et al. |
| 7,376,433 B1 | 5/2008 | Hose |
| 7,407,089 B2 | 8/2008 | Patrick |
| 7,680,690 B1 | 3/2010 | Catalano |
| 7,711,100 B2 | 5/2010 | Dennis |
| 7,725,326 B1 | 5/2010 | Tracy et al. |
| 7,730,151 B1 | 6/2010 | Fabbri et al. |
| 7,848,765 B2 | 12/2010 | Phillips et al. |
| 7,970,418 B2 | 6/2011 | Schmidt et al. |

(Continued)

FOREIGN PATENT DOCUMENTS

| | | |
|---|---|---|
| DE | 20 2012 100 620 U1 | 8/2012 |
| GB | 201301094 A | 3/2013 |

(Continued)

OTHER PUBLICATIONS

Notice of Allowability dated Sep. 4, 2020, for U.S. Appl. No. 14/568,905, of Butts, J.F., et al., filed Dec. 12, 2014.

(Continued)

*Primary Examiner* — Fateh M Obaid
(74) *Attorney, Agent, or Firm* — Polsinelli PC

(57) ABSTRACT

A service provider system may store buyer information and merchant information related to past purchasing history of one or more buyers. In some examples, based in part on the buyer information and/or the merchant information the service provider system may identify items that the buyer regularly or habitually purchases. In some cases, the service provider system may pre-order or pre-purchase the items on behalf of the buyer and send a message to a device associated with the buyer to inform the buyer that an order for the regularly purchased item has been placed.

18 Claims, 10 Drawing Sheets

(56) References Cited

U.S. PATENT DOCUMENTS

| | | | |
|---|---|---|---|
| 8,001,044 B2 | 8/2011 | Davis | |
| 8,065,080 B2 | 11/2011 | Koch | |
| 8,090,351 B2 | 1/2012 | Klein | |
| 8,135,624 B1 | 3/2012 | Ramalingam et al. | |
| 8,200,247 B1 | 6/2012 | Starenky et al. | |
| 8,229,458 B2 | 7/2012 | Busch | |
| 8,417,377 B2 | 4/2013 | Rothschild | |
| 8,490,871 B1 | 7/2013 | Miller | |
| 8,504,073 B2 | 8/2013 | Svendsen et al. | |
| 8,626,591 B2 | 1/2014 | Ablowitz | |
| 8,635,157 B2 | 1/2014 | Smith et al. | |
| 8,645,366 B1 | 2/2014 | Acharya | |
| 8,756,187 B2 | 6/2014 | Wilson et al. | |
| 8,892,249 B2 | 11/2014 | Holman et al. | |
| 8,898,288 B2 | 11/2014 | Petersen et al. | |
| 8,918,355 B2 | 12/2014 | Perrier et al. | |
| 9,218,633 B2 * | 12/2015 | Hulett | A47J 36/00 |
| 9,334,150 B1 | 5/2016 | Ost et al. | |
| 9,499,385 B1 | 11/2016 | Studor | |
| 9,589,290 B1 * | 3/2017 | Hipschman | G06Q 20/20 |
| 9,659,310 B1 | 5/2017 | Allen et al. | |
| 9,779,446 B1 * | 10/2017 | Hipschman | G06Q 30/0639 |
| 9,875,471 B1 * | 1/2018 | Myrick | G06Q 10/109 |
| 10,127,595 B1 | 11/2018 | Daniel et al. | |
| 10,152,680 B1 * | 12/2018 | Myrick | G06Q 10/02 |
| 10,319,013 B2 * | 6/2019 | Moring | G06Q 30/0609 |
| 10,410,272 B1 | 9/2019 | Johnson et al. | |
| 10,430,849 B1 * | 10/2019 | Hipschman | G06Q 30/0639 |
| 10,755,254 B1 * | 8/2020 | Hipschman | G06Q 30/0637 |
| 10,852,151 B2 * | 12/2020 | Butts, III | G06Q 30/0261 |
| 2002/0059147 A1 | 5/2002 | Ogasawara | |
| 2002/0065728 A1 | 5/2002 | Ogasawara | |
| 2002/0174010 A1 | 11/2002 | Rice, III | |
| 2003/0061109 A1 | 3/2003 | Banerjee et al. | |
| 2003/0069780 A1 | 4/2003 | Hailwood et al. | |
| 2003/0126016 A1 | 7/2003 | Asano | |
| 2003/0204447 A1 | 10/2003 | Dalzell et al. | |
| 2004/0093281 A1 | 5/2004 | Silverstein et al. | |
| 2004/0236696 A1 | 11/2004 | Aoki et al. | |
| 2004/0249497 A1 | 12/2004 | Saigh et al. | |
| 2005/0216354 A1 * | 9/2005 | Bam | G06Q 40/00 705/26.1 |
| 2006/0143073 A1 | 6/2006 | Engel et al. | |
| 2006/0200305 A1 | 9/2006 | Sheha et al. | |
| 2007/0033110 A1 * | 2/2007 | Philipp | G06Q 30/0621 705/5 |
| 2007/0088624 A1 | 4/2007 | Vaughn et al. | |
| 2007/0150375 A1 | 6/2007 | Yang | |
| 2007/0203801 A1 | 8/2007 | Istfan | |
| 2007/0281689 A1 | 12/2007 | Altman et al. | |
| 2008/0091448 A1 * | 4/2008 | Niheu | G06Q 10/06314 705/301 |
| 2008/0104199 A1 | 5/2008 | Kalaboukis | |
| 2008/0154781 A1 | 6/2008 | Kumar | |
| 2008/0294751 A1 | 11/2008 | Dreiling | |
| 2009/0005987 A1 | 1/2009 | Vengroff et al. | |
| 2009/0006156 A1 | 1/2009 | Hunt et al. | |
| 2009/0048890 A1 | 2/2009 | Burgh | |
| 2009/0063312 A1 | 3/2009 | Hurst | |
| 2009/0070178 A1 * | 3/2009 | Gilbert | G06Q 10/109 705/7.19 |
| 2009/0204492 A1 * | 8/2009 | Scifo | G06Q 30/0603 705/14.36 |
| 2010/0114654 A1 | 5/2010 | Lukose et al. | |
| 2010/0184416 A1 | 7/2010 | Gupta et al. | |
| 2010/0274597 A1 | 10/2010 | Dill | |
| 2010/0312385 A1 | 12/2010 | Deuber | |
| 2011/0125566 A1 | 5/2011 | McLaughlin et al. | |
| 2011/0201317 A1 | 8/2011 | Karandikar et al. | |
| 2011/0238474 A1 | 9/2011 | Carr et al. | |
| 2011/0256881 A1 | 10/2011 | Huang et al. | |
| 2011/0260860 A1 | 10/2011 | Gupta | |
| 2011/0313867 A9 | 12/2011 | Silver | |
| 2011/0321146 A1 | 12/2011 | Vemon et al. | |
| 2012/0078673 A1 | 3/2012 | Koke et al. | |
| 2012/0127490 A1 | 5/2012 | Ogasawara et al. | |
| 2012/0156337 A1 | 6/2012 | Studor et al. | |
| 2012/0191522 A1 | 7/2012 | McLaughlin et al. | |
| 2012/0265364 A1 | 10/2012 | Zambrano | |
| 2012/0276928 A1 | 11/2012 | Shutter | |
| 2012/0284769 A1 | 11/2012 | Dixon et al. | |
| 2012/0295639 A1 | 11/2012 | Fitoussi et al. | |
| 2013/0024375 A1 | 1/2013 | Choudhuri et al. | |
| 2013/0024376 A1 | 1/2013 | Choudhuri et al. | |
| 2013/0030955 A1 | 1/2013 | David | |
| 2013/0035114 A1 | 2/2013 | Holden et al. | |
| 2013/0040663 A1 * | 2/2013 | Gold | H04W 4/18 455/456.3 |
| 2013/0041781 A1 * | 2/2013 | Freydberg | G06Q 30/06 705/27.1 |
| 2013/0103541 A1 | 4/2013 | Chow | |
| 2013/0151380 A1 | 6/2013 | Holt | |
| 2013/0169046 A1 | 7/2013 | Shin et al. | |
| 2013/0178233 A1 * | 7/2013 | McCoy | H04W 4/027 455/456.3 |
| 2013/0218991 A1 | 8/2013 | McConnell et al. | |
| 2013/0297321 A1 | 11/2013 | Raux et al. | |
| 2013/0311315 A1 | 11/2013 | Zises | |
| 2013/0332509 A1 * | 12/2013 | Schwartz | G07C 11/00 709/203 |
| 2014/0012806 A1 | 1/2014 | Ching et al. | |
| 2014/0032341 A1 | 1/2014 | Balasubramanian et al. | |
| 2014/0045516 A1 | 2/2014 | Turgman et al. | |
| 2014/0074610 A1 | 3/2014 | Bilange | |
| 2014/0095063 A1 * | 4/2014 | Saraswat | G06Q 30/0631 701/410 |
| 2014/0108177 A1 | 4/2014 | Erke et al. | |
| 2014/0136259 A1 * | 5/2014 | Kinsey, II | G06Q 10/1095 705/7.16 |
| 2014/0156410 A1 | 6/2014 | Wuersch et al. | |
| 2014/0195454 A1 | 7/2014 | Richie et al. | |
| 2014/0279123 A1 | 9/2014 | Harkey et al. | |
| 2014/0279192 A1 | 9/2014 | Selby | |
| 2014/0289071 A1 | 9/2014 | Fox et al. | |
| 2014/0289073 A1 | 9/2014 | Gold | |
| 2014/0324431 A1 | 12/2014 | Graf et al. | |
| 2014/0359510 A1 | 12/2014 | Chan et al. | |
| 2014/0379578 A1 | 12/2014 | Shastry et al. | |
| 2015/0046271 A1 * | 2/2015 | Scholl | G06Q 30/02 705/15 |
| 2015/0039462 A1 | 4/2015 | Moring et al. | |
| 2015/0142604 A1 | 9/2015 | Bondesen et al. | |
| 2015/0254699 A1 | 9/2015 | Rados et al. | |
| 2015/0262244 A1 | 10/2015 | Vincent | |
| 2015/0302383 A1 | 10/2015 | Mills et al. | |
| 2015/0304806 A1 | 10/2015 | Vincent et al. | |
| 2016/0098806 A1 * | 4/2016 | Chen | G06Q 50/16 705/313 |
| 2016/0125506 A1 | 6/2016 | Butts, III et al. | |
| 2016/0169696 A1 | 6/2016 | Butts, III et al. | |
| 2017/0011450 A1 * | 1/2017 | Frager | G06Q 20/24 |
| 2017/0161372 A1 * | 6/2017 | Fernandez | G06F 40/268 |
| 2017/0270573 A1 * | 9/2017 | Kim | G06Q 30/06 |
| 2019/0355034 A1 | 11/2019 | Moring et al. | |
| 2021/0073885 A1 | 3/2021 | Hipschman et al. | |

FOREIGN PATENT DOCUMENTS

| | | |
|---|---|---|
| GB | 2511485 A | 9/2014 |
| JP | 4200645 B2 | 12/2008 |
| WO | 2014/032047 A1 | 2/2014 |
| WO | 2015/066056 A1 | 5/2015 |
| WO | 2016/094500 A2 | 6/2016 |

OTHER PUBLICATIONS

Advisory Action dated Nov. 7, 2019, for U.S. Appl. No. 14/568,905, of Butts III, J.F., et al., filed Dec. 12, 2014.

Advisory Action dated Nov. 18, 2019, for U.S. Appl. No. 15/395,721, of Hipschman, D., et al., filed Dec. 30, 2016.

(56) References Cited

OTHER PUBLICATIONS

Examination Report for European Patent Application No. 15867710. 4, dated Dec. 10, 2019.
Non-Final Office Action dated Nov. 3, 2020, for U.S. Appl. No. 16/425,334, of Moring, M.D., et al., filed May 29, 2019.
Torroja et al., "Putting the (ultra-low) Power in GeoFence", GPS World dated Oct. 31, 2013, pp. 1-13.
Notice of Allowance dated Jul. 20, 2020, for U.S. Appl. No. 14/568,905, of Butts, J.F., et al., filed Dec. 12, 2014.
Corrected Notice of Allowability dated Jul. 22, 2020, for U.S. Appl. No. 15/395,721, of Hipschman, D., et al., filed Dec. 30, 2016.
Office Action for European Patent Application No. 15867710.4, dated Sep. 24, 2020.
Non Final Rejection dated Mar. 16, 2020, for U.S. Appl. No. 14/568,905 of Butts, J.F., et al., filed Dec. 12, 2014.
Notice of Allowance dated Apr. 17, 2020, for U.S. Appl. No. 15/395,721 of Hipschman, D. et al., filed Dec. 12, 2014.
"Uber—Android Apps on Google Play," dated Nov. 10, 2014, Retrieved from the internet URL: https://play.google.com/store/apps/details?id=com.ubercab.
Hachman, M., "MobilePay: Your Phone Is Your Credit Card," dated Sep. 28, 2010, Retrieved from the Internet URL: http://www.pcmag.com/article2/0,2817,2369877,00.asp, on Sep. 25, 2013, 1 page.
Siegler, MG., "MobilePay May Be the Death of the Wallet. Yes, for Real This Time," TechCrunch, dated Sep. 28, 2010, Retrieved from the internet URL: http://techcrunch.com/2010/09/28/mobilepayusa/, on Sep. 22, 2013, pp. 12.
Non Final Office Action dated Mar. 3, 2015, for U.S. Appl. No. 14/587,758, of Hipschman, D., et al., filed Dec. 31, 2014.
Non-Final Office Action dated Apr. 2, 2015, for U.S. Appl. No. 14/587,984, of Hipschman, D., et al., filed Dec. 31, 2014.
Final Office Action dated Sep. 25, 2015, for U.S. Appl. No. 14/587,758, of Hipschman, D., et al., filed Dec. 31, 2014.
Final Office Action dated Sep. 25, 2015, for U.S. Appl. No. 14/587,984, of Hipschman, D., et al., filed Dec. 31, 2014.
Non-Final Office Action dated Oct. 7, 2015, for U.S. Appl. No. 14/587,913, of Hipschman, D., et al., filed Dec. 31, 2014.
Advisory Action dated Feb. 19, 2016, for U.S. Appl. No. 14/587,984, of Hipschman, D., et al., filed Dec. 31, 2014.
Non-Final Office Action dated Apr. 4, 2016, for U.S. Appl. No. 14/587,984, of Hipschman, D., et al., filed Dec. 31, 2014.
Non-Final Office Action dated Apr. 21, 2016, for U.S. Appl. No. 14/587,758, of Hipschman, D., et al., filed Dec. 31, 2014.
Final Office Action dated Sep. 8, 2016, for U.S. Appl. No. 14/587,913, of Hipschman, D., et al., filed Dec. 31, 2014.
Notice of Allowance dated Oct. 13, 2016, for U.S. Appl. No. 14/587,984, of Hipschman, D., et al., filed Dec. 31, 2014.
Final Office Action dated Nov. 4, 2016, for U.S. Appl. No. 14/587,758, of Hipschman, D., et al., filed Dec. 31, 2014.
Advisory Action dated Dec. 12, 2016, for U.S. Appl. No. 14/587,913, of Hipschman, D., et al., filed Dec. 31, 2014.
Non-Final Office Action dated Feb. 23, 2017, for U.S. Appl. No. 14/311,176, of Moring, M.D., et al., filed Jun. 20, 2014.
Non-Final Office Action dated Mar. 9, 2017, for U.S. Appl. No. 14/588,044, of Hipschman, D., et al., filed Dec. 31, 2014.
Advisory Action dated Mar. 13, 2017, for U.S. Appl. No. 14/587,758, of Hipschman, D., et al., filed Dec. 31, 2014.
Notice of Allowance dated Apr. 21, 2017, for U.S. Appl. No. 14/587,758, of Hipschman, D., et al., filed Dec. 31, 2014.
Non-Final Office Action dated May 19, 2017, for U.S. Appl. No. 14/464,276, of Johnson, L., et al., filed Aug. 20, 2014.
Notice of Allowance dated May 23, 2017, for U.S. Appl. No. 14/587,913, of Hipschman, D., et al., filed Dec. 31, 2014.
Final Office Action dated Jul. 20, 2017, for U.S. Appl. No. 14/588,044, of Hipschman, D., et al., filed Dec. 31, 2014.
Final Office Action dated Aug. 10, 2017, for U.S. Appl. No. 14/311,176, of Moring, M.D., et al., filed Jun. 20, 2014.
Non-Final Office Action dated Sep. 20, 2017, for U.S. Appl. No. 14/587,758, of Hipschman, D., et al., filed Dec. 31, 2014.
Final Office Action dated Nov. 24, 2017, for U.S. Appl. No. 14/464,276, of Johnson, L., et al., filed Aug. 20, 2014.
Non-Final Office Action dated Jan. 29, 2018, for U.S. Appl. No. 14/568,905, of Butts, J.F., et al., filed Dec. 12, 2014.
Non-Final Office Action dated Feb. 13, 2018, U.S. Appl. No. 14/311,176, of Moring, M.D., et al., filed Jun. 20, 2014.
Non-Final Office Action dated Apr. 9, 2018, for U.S. Appl. No. 14/588,044, of Hipschman, D., et al., filed Dec. 31, 2014.
Non-Final Office Action dated Apr. 20, 2018, for U.S. Appl. No. 14/464,276, of Johnson, L., et al., filed Aug. 20, 2014.
Notice of Allowance dated May 16, 2018, for U.S. Appl. No. 14/587,758, of Hipschman, D., et al., filed Dec. 31, 2014.
Final Office Action dated Jun. 25, 2018, for U.S. Appl. No. 14/568,905, of Butts, J.F., et al., filed Dec. 12, 2014.
Final Office Action dated Jul. 20, 2018, U.S. Appl. No. 14/311,176, of Moring, M.D., et al., filed Jun. 20, 2014.
Final Office Action dated Aug. 28, 2018, for U.S. Appl. No. 14/588,044, of Hipschman, D., et al., filed Dec. 31, 2014.
Advisory Action dated Sep. 13, 2018, for U.S. Appl. No. 14/568,905, of Butts, J.F., et al., filed Dec. 12, 2014.
Final Office Action dated Nov. 16, 2018, for U.S. Appl. No. 14/464,276, of Johnson, L., et al., filed Aug. 20, 2014.
Advisory Action dated Nov. 20, 2018, for U.S. Appl. No. 14/588,044, of Hipschman, D., et al., filed Dec. 31, 2014.
Non-Final Office Action dated Dec. 11, 2018, for U.S. Appl. No. 15/395,721, of Hipschman, D., et al., filed Dec. 30, 2016.
Notice of Allowance dated Jan. 24, 2019, for U.S. Appl. No. 14/311,176 of Moring, M.D., et al., filed Jun. 20, 2014.
Non-Final Office Action dated Feb. 4, 2019, for U.S. Appl. No. 14/568,905, of Butts, J.F., et al., filed Dec. 12, 2014.
Notice of Allowance dated Feb. 20, 2019, for U.S. Appl. No. 14/311,176 of Moring, M.D., et al., filed Jun. 20, 2014.
Notice of Allowance dated Apr. 17, 2019, for U.S. Appl. No. 14/464,276, of Johnson, L., et al., filed Aug. 20, 2014.
Notice of Allowance dated May 23, 2019, for U.S. Appl. No. 14/588,044, of Hipschman, D., et al., filed Dec. 31, 2014.
Final Office Action dated Jul. 1, 2019, for U.S. Appl. No. 15/395,721, of Hipschman, D., et al.,, filed Dec. 30, 2016.
Final Office Action dated Aug. 14, 2019, for U.S. Appl. No. 14/568,905, of Butts, J.F., et al., filed Dec. 12, 2014.
International Search Report and Written Opinion for International Application No. PCT/US2014/062697, dated Feb. 10, 2015.
International Search Report and Written Opinion for PCT Application No. PCT/US2015/064671 dated Feb. 23, 2016.
Extended European Search Report for European Patent Application No. 15867710.4, dated Sep. 14, 2017.
Final Office Action dated Mar. 15, 2021, for U.S. Appl. No. 16/425,334, of Moring, M.D., et al., filed May 29, 2019.
Non-Final Office Action dated Jul. 9, 2021, for U.S. Appl. No. 16/425,334, of Moring, M.D., et al., filed May 29, 2019.

* cited by examiner

PREDICTING ORDERS FROM BUYER BEHAVIOR

CROSS REFERENCE TO RELATED APPLICATION

This application claims priority to and is a continuation of U.S. patent application Ser. No. 14/464,276, filed on Aug. 20, 2014, entitled PREDICTING ORDERS FROM BUYER BEHAVIOR, the contents of which is herein incorporated by reference in its entirety.

BACKGROUND

Buyers typically conduct transactions with many different merchants for acquiring many different types of goods and services. Merchants, who are purveyors of these goods and services, often perform transactions in person with their customers at point of sale locations. Further, many of these transactions are performed by buyers with particular merchants on a regular basis, e.g., daily, weekly, monthly, etc. However, merchants may have very little access to information about the overall shopping habits of their customers. Accordingly, it can be difficult for merchants to assist buyers in processing these regularly conducted transactions.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
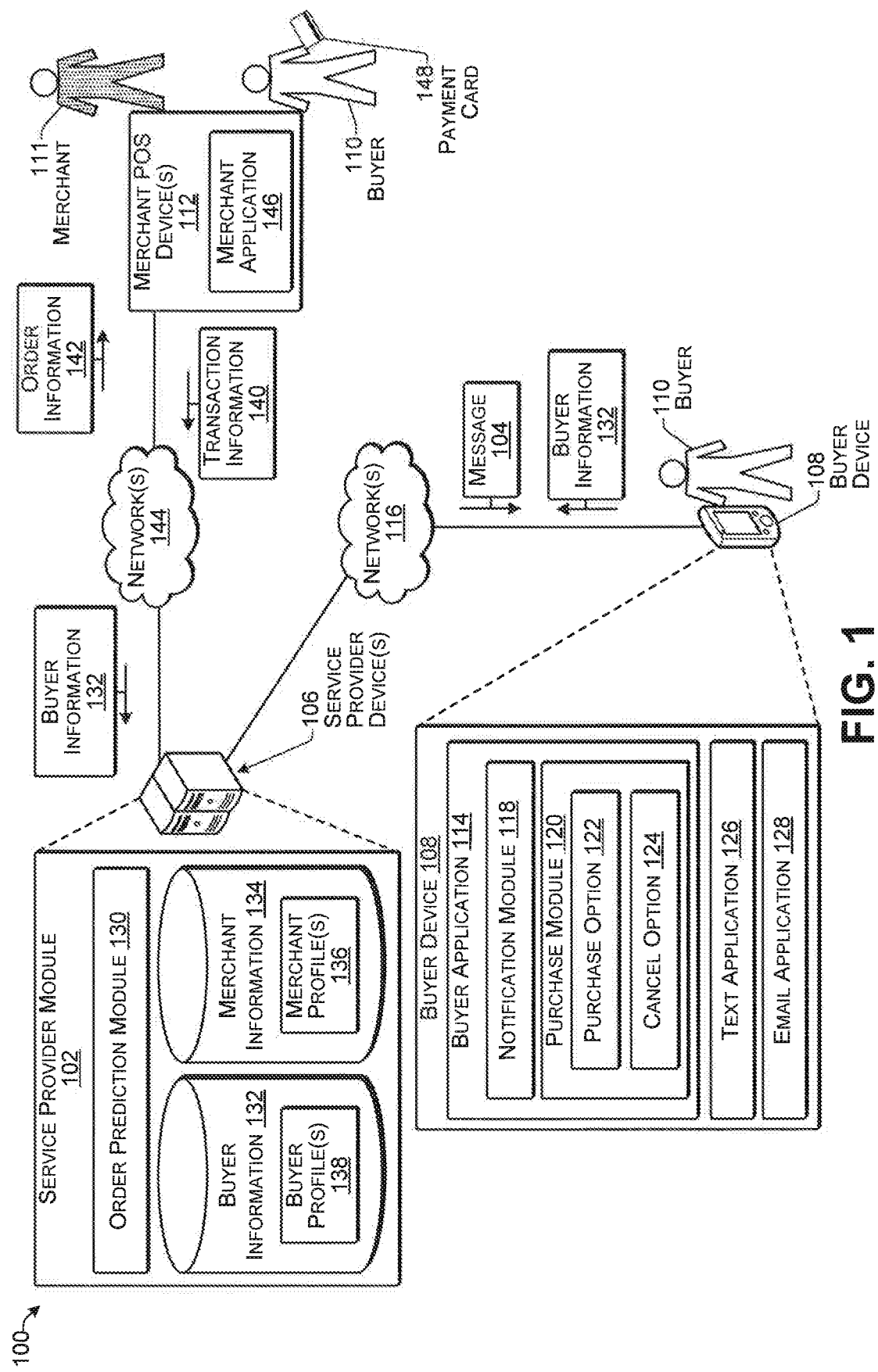
FIG. 1 illustrates an example environment for a payment and order recommendation service according to some implementations.

Some implementations described herein include techniques and arrangements for providing item orders or other item recommendations to a buyer based on the buyer's habitual or otherwise regular purchasing behavior. For example, a service provider may provide a payment and item recommendation service to merchants and buyers to enable transactions between the merchants and the buyers. As used herein, a transaction may include a financial transaction for the acquisition of goods and/or services (referred to herein as items) that is conducted between a buyer (e.g., a customer) and a merchant, such as in person at a point of sale (POS) location. In some examples, in anticipation of a transaction, the service provider may send an item order or other item recommendation to a buyer device associated with a buyer. For instance, the item recommendation may offer to place an order for the buyer with a particular merchant, such as at a POS location from which the buyer may regularly purchase a particular item.

In some examples, the service provider may store buyer information and merchant information. The buyer information and/or the merchant information may include data related to the past purchasing history of individual buyers obtained from the transactions conducted between the buyers and the merchants. The service provider may then make recommendations to an individual buyer, via a buyer device, offering to conduct or conclude a transaction with a particular merchant for one or more items that the individual buyer regularly purchases based at least in part on an analysis of the buyer information and/or the merchant information.

As an example, the service provider may determine from the buyer information or the merchant information that a buyer purchases a latte beverage from a first merchant at 6:00 am every morning from Monday-Friday and at 9:00 am on Saturday. The service provider may also determine that the buyer typically orders breakfast for two (e.g., the buyer and the buyer's spouse) on Sunday at 9:30 am at a location associated with a second merchant. Based on these determinations, the service provider may send a recommendation to a buyer device associated with the buyer at 5:30 am on Monday-Friday morning asking if the buyer would like the service provider to place an order, on the buyer's behalf, with the first merchant for a latte. Likewise, on Saturday, the service provider may send a recommendation to the buyer device at 8:30 am asking if the buyer would like to place an order with the first merchant for the latte. In this case, the recommendation may be sent at 8:30 am instead of 6:30 am, as the service provider may determine that since the order is for a hot drink, the order should be placed with the merchant at a time close to the time that the buyer would typically pick up or otherwise purchase the item to prevent the latte from cooling before the buyer is able to arrive at the first merchant's physical location. Alternatively, the service provider may send the recommendation to the buyer at a time the service provider knows the buyer device is accessible to the buyer, such as at 5:00 am before the buyer leaves for work, for instance, to avoid distracting the buyer while driving. In this alternative example, the service provider may place the order with the merchant close to the time when the buyer is expected to pick up the order and/or may notify the merchant of a pickup time or other time that the latte should be ready for the buyer.

On Sunday, the service provider may send an offer to make a reservation with the second merchant for 9:30 am rather than a recommendation to purchase one or more particular items with the second merchant. For instance, the service provider may be aware from the buyer's past purchasing history that the buyer and/or the buyer's spouse select from a wide variety of breakfast foods when eating at the second merchant's establishment. In some cases, the message sent by the service provider may include a particular item as part of a breakfast recommendation, such as an item on special or a new item added to the second merchant's menu. In some instances, the service provider may provide the offer or other recommendation to the buyer device on Friday or Saturday if the service provider determines that the second merchant is particularly busy on Sunday morning and obtaining a reservation requires making the reservation one or more days prior to the desired time and date. In some situations, the service provider may recommend alternative similar merchants when, for instance, the second merchant is fully booked.

In some implementations, the service provider, in addition, to placing an order or making a reservation on behalf of the buyer, may complete the transaction with a merchant and/or act as an intermediary in terms of payment processing. For example, the service provider may store information related to a payment card or an electronic payment account associated with the buyer. In this example, the buyer may be presented with a virtual control to purchase the item in addition to or in lieu of a virtual control to place an order with the merchant. When the buyer selects the purchase virtual control, the buyer may provide the service provider authorization to complete the transaction with the merchant using the stored payment card and/or electronic payment account. In some cases, the method of payment may be selected by the buyer (e.g., the buyer is presented with payment types selection as part of the purchase virtual control), such as based in part on the type of merchant, and/or based in part on the buyer's pre-authorizations and/or preferences.

In some implementations, the service provider may place the order or make the reservation and the buyer may complete the transaction with the merchant at the time of pickup or time of the reservation, for instance, via a merchant point of sale (POS) device. In other implementations, the service provider may have a high confidence that the buyer will purchase a particular item on a particular day at a particular time. In this implementation, the service provider may send a message to the buyer via the device to indicate to the buyer that the particular item has been purchased and/or an order has been placed and is ready for pick up. For instance, in example above, the service provider may present a message on the buyer's device at 5:50 am on Monday-Friday indicating to the buyer that the buyer's morning latte has been ordered from the first merchant, as the service provider has calculated a confidence rating of greater than a threshold amount that the buyer plans to purchase the latte on that day and at that time. In some cases, the service provider may place the order and present the buyer with a virtual control to cancel the order. In other cases, the service provider may pre-complete the transaction with the first merchant including payment processing before notifying the buyer that the latte is ready.

In some examples, the buyer information available to the service provider may include data related to more than past purchasing history. For instance, the service provider may have access to location information associated with the buyer, calendar information related to the buyer, financial information related to the buyer, etc. In other instances, the service provider may be able to infer information related to the buyer based at least in part on transaction history, profile information, preferences, location information, financial information, and calendar information. For example, the service provider may infer the buyer is on a diet if the buyer's transaction history includes a large amount of diet or health foods, or that the buyer is sick if the transaction history indicates purchases of one or more prescriptions or over the counter drugs at a pharmacy.

As one particular example, the buyer's device may provide geo-location information to the service provider related to the current location of the buyer. In this example, the service provider may determine that the buyer is on vacation or otherwise traveling, which may cause the service provider to determine that the buyer's regular purchasing activities may have changed at least temporarily and, thus lowering the service provider's confidence rating associated with particular purchases. In some cases, the service provider may identify other merchants or establishments that are similar to the first merchant, in the example above, but are proximal to the buyer's current location (e.g., within a threshold distance of the buyer device). In these cases, the service provider may send a message to the buyer to offer to pre-order the buyer's morning latte from one or more suggested merchants that are near the buyer's current location. In some cases, the service provider may be unable to locate a nearby merchant that sells a particular item. For instance, if the item regularly ordered by the buyer is an iced almond syrup latte with soymilk, the item may not be widely available. In these cases, the service provider may notify the buyer that no merchants within a threshold distance from the buyer's current location offer the buyer's regularly purchased item. In some instances, the service provider may recommend an alternative item from a nearby merchant as a substitute for the buyer's regularly purchased item.

In some implementations, the buyer's device may have an order processing application or other buyer application installed to enable receipt and transmission of the messages, recommendations, and/or responses between the buyer and the service provider. For example, the buyer may subscribe to the recommendation and message services provided by the service provider by downloading the buyer application to one or more buyer devices. For instance, the order recommendation service herein may be included with an electronic payment application provided by the service provider that enables the buyer to pay for items purchased from various merchants using a payment account established with the service provider. In other implementations, the service provider may be configured to communicate with the buyer via email exchanges and/or text messages. For example, the service provider may maintain a website from which the buyer may subscribe to the recommendation and message services, such as by supplying an email address, phone number, and/or one or more authorizations.

In some implementations, the buyer may grant one or more authorizations to the service provider. For example, the service provider may be granted access to the buyer's calendar on the buyer device, and/or may be granted permission by the buyer to interact with another service provider, such as an email service. In this example, the service provider may insert calendar appointments related to reservations placed and/or pickup times associated with items ordered by the service provider on behalf of the buyer. In other examples, the service provider may have authorization to charge one or more credit cards or other payment cards on behalf of the buyer.

In some cases, the past purchasing history related to individual buyers may be obtained from merchants when the individual buyer pays for a transaction using any of cash, a check, a payment card, or an electronic payment account, such as may be accessed using a buyer device carried by the buyer. For example, the merchant may interact with a POS computing device (i.e., a merchant device) to process the transaction. During the transaction, the merchant device can send, to the service provider, transaction information describing the transaction, such as a description of the item(s) selected by the buyer, price(s) of the item(s) selected, a time, place and date of the transaction, and so forth. In addition, the merchant device can often include buyer identifying information with the transaction information sent to the service provider. For instance, buyer identifying information may be determined from a payment card of the current buyer, from an electronic payment account of the current buyer, from a merchant club membership for which the current buyer has signed up, or the like.

The service provider may continually receive transaction information from a plurality of merchants, and may organize the transaction information into merchant profiles and/or buyer profiles. For example, a single buyer profile may include transaction information for a plurality transactions conducted by the corresponding buyer with various different merchants. The transaction information from a plurality of buyer profiles may be aggregated and analyzed to determine characteristics of buyers that are customers or potential customers of a particular merchant, and to determine which items particular buyers or types of buyers have purchased together, or may be likely to purchase together during a single transaction.

In other cases, the service provider may collect the buyer information and/or the merchant information directly from the buyer via a purchase order application, the sign up process, one or more APIs associated with private or public databases, one or more surveys, or access to other applications or components installed on the buyer's device. For example, the service provider may receive location information from one or more services (e.g., a navigation application) and components (e.g., a global positions system) associated with the buyer device. As another example, the service provider may receive transaction information directly from one or more payment card service companies (e.g., Visa®, MasterCard®, etc.).

In some instances, in addition to offering to purchase or pre-purchasing the regularly purchased item, the service provider may recommend one or more additional items related to the regularly purchased item, thereby inviting the buyer to spend more money at the merchant by adding an additional item to the buyer's regular order. For instance, the added item may be from an item category that is different from that of the first item, but which might be considered an accompaniment to the first item or related to the first item. As one example, if a customer has regularly ordered a cup of coffee, the service provider may notify the buyer that the merchant also offers a donut with the coffee as a cross-sell suggestion.

For discussion purposes, some example implementations are described in the environment of a service that makes targeted purchase offers to buyers based on analysis of transaction information and/or buyer profiles. However, implementations herein are not limited to the particular examples provided, and may be extended to other environments, other system architectures, other types of buyer devices, and so forth, as will be apparent to those of skill in the art in light of the disclosure herein.

FIG. 1 illustrates an example environment 100 for a payment and item recommendation service according to some implementations. For instance, the environment 100 may enable a service provider module 102 to transmit messages 104 from a service provider device 106 to a buyer device 108 to assist a buyer 110 in placing an order and/or completing a transaction related to a regularly purchased item with a merchant 111 associated with a merchant POS device 112. For example, as discussed above, the service provider module 102 may place an order, or may offer to place an order, for the buyer's Monday morning latte with a particular merchant POS device 112 associated with a particular merchant 111 that the buyer 110 regularly visits on Monday mornings. As one example, the service provider module 102 may transmit a message 104 to the buyer device 108 to inform the buyer 110 that the service provider module 102 has placed the order and the latte should be ready for pick up at the POS location associated with the particular merchant 111.

In the illustrated example, the buyer 110 has the buyer device 108 that may execute a buyer application 114. For instance, some buyers 110 may carry buyer devices 108, such as smart phones, tablet computers, wearable computing devices, or the like, as further enumerated elsewhere herein, and some of these buyer devices 108 may have installed thereon the buyer application 114. The buyer application 114 may include electronic payment capability, which enables the buyer 110 to make a payment to the merchant POS devices 112 using the buyer application 114, rather than paying with a physical payment card, cash, check, etc.

The buyer application 114 may further enable the buyer 110 to receive the message 104 from the service provider module 102 on the service provider devices 106 over one or more networks 116. For instance, the message 104 may be related to order recommendations, pre-scheduled appointments, and/or pre-purchased or ordered items and services. As one example, the buyer 110 may receive the message 104 through the buyer application 114, such as that an order for a latte to be purchased and picked up by the buyer 110 has been placed with a particular merchant POS device 112. Thus, the buyer 110 is able to go to the merchant's establishment, pickup, and pay for the latte without having to wait for the latte to be brewed.

In some implementations, the buyer application 114 includes a notification module 118 for presenting, to the buyer 110, the messages 104 received from the service provider module 102. In some instances, the notification module 118 may cause the buyer device 108 to generate a visual, audio, and/or physical notification to inform the buyer 110 that the message 104 was received. For example, the buyer device 108 may turn on a display, emit an audible tune, or vibrate. In some examples, the notification module 118 may cause the buyer application 114 to become the active application on the buyer device 108, and/or may cause the display to turn on and present the message 104 to the buyer 110 as text in a graphic user interface. In other examples, the buyer application 114 may continue to operate as a background application, while the notification module 118 may cause the message 104 to be presented on the buyer device 108 in a user interface displayed over other applications currently active on the buyer device 108. For instance, the buyer application 114 may interact with an operating system (not shown in FIG. 1) on the buyer device 108 to cause the message 104 to be presented by the OS as a widget or other notification generated by the OS. In some examples, the notification module 118 or the OS may issue a notification in response to receiving a message 104 from the service provider module 102. However, in other examples, the buyer application 114 may be configured to order an item on behalf of the buyer 110 without input of the service provider module 102 and, therefore, the notification module 118 may issue a notification to the buyer 110 prior to or without receiving a message 104 from the service provider module 102.

In some cases, the buyer application 114 may also include a purchase module 120 that presents the buyer 110 with a purchase virtual control 122 to complete the transaction related to the message 104 and recommended or placed by the service provider module 102. For example, the purchase virtual control 122 may allow the buyer 110 to authorize the service provider module 102 to complete the payment transaction with one or more of the merchant POS devices 112 associated with the item recommended in the message. In other examples, the purchase virtual control 122 may authorize the service provider module 102 to place the order but not necessarily to complete the payment. In some cases, the purchase module 120 may also include a cancel virtual control 124. The cancel virtual control 124 may allow the buyer 110 to cancel the order placed by the service provider module 102, for instance, if the buyer 110 is on vacation and does not plan to pick up his or her pre-work Monday morning latte.

In some specific examples, the buyer 110 may not have installed the buyer application 114 on the buyer device 108. In these examples, the buyer device 108 may receive the messages 104 from the service provider module 102 via a text application 126 or an email application 128. In some cases, a notification may still be generated in response to receiving the text or email message 104 from the service provider module 102 to inform the buyer 110 that an order has been placed, an appointment has been scheduled, or a purchase has been made. Further, while the buyer application 114 has been described in the context of a mobile application executable on a mobile device, in other contexts, the buyer application 114 may included any module or executable code that perform the functions described herein, whether part of a larger application, the OS, or a stand-alone piece of software.

In the illustrated example, the service provider module 102 determines when to place orders, schedule appointments, and/or purchase items or services on behalf of the buyer 110. The service provider module 102 may also send or transmit the message 104 to the buyer device 108 when the service provider module 102 places an order, schedules an appointment, or purchase an item on behalf of the buyer 110. In some instances, the service provider module 102 may include an order prediction module 130, and may further store buyer information 132 and/or merchant information 134. The order prediction module 130 may access the buyer information 132 and/or the merchant information 134 to identify regular purchases made by the individual buyers, such as buyer 110. The buyer information 132 and/or the merchant information 134 may include transaction information related to the past purchasing history of individual buyers. In some examples, the service provider may organize the merchant information 134 and the buyer information 132 into merchant profiles 136 and buyer profiles 138, respectively. For example, a single buyer profile 138 may include transaction information 140 for a plurality of transactions conducted by the corresponding buyer with various different merchants. The transaction information 140 from a plurality of buyer profiles 138 may be aggregated and analyzed to determine characteristics of buyers that are customers of a particular merchant, and to determine which items particular buyers or types of buyers have purchased during transactions at various times of day, days of the week, months of the year, under various weather conditions, during various local events, and so forth.

The transaction information 140 may include details about the item(s) purchased by the buyer 110, such as a description of each item, the price paid, the time of day, date, location, merchant, etc. In some instances, the transaction information 140 received by the service provider module 102 may be related to other buyers, in addition to the buyer 110. In addition, the transaction information 140 may include buyer identifying information that may be used to match particular transactions with particular buyer profiles 138.

As one example, suppose that the order prediction module 130 determines, from the buyer information 132, that the buyer 110 purchases a latte between 5:59 am and 6:11 am 94% of the time when the day is a weekday and 2% of the time when the day is a weekend. Further, the order prediction module 102 may determine that the buyer 110 purchases the latte from a first merchant POS device 112 associated with a first merchant 99% of the time and from a second merchant POS device 112 associated with a second merchant 1% of the time. In this example, the order prediction module 102 may determine, with a high degree of confidence, that the buyer 110 will place an order for a latte near 6:00 am on Monday through Friday from the first merchant POS device 112. Since the order prediction module 130 was able to determine a regular purchase of the latte from the first merchant POS device 112, the service provider module 102 may provide order information 142 to the first merchant POS device 112. For example, the service provider module 102 may send a request to the first merchant POS 112 to place an order for the latte on behalf of the particular buyer 110 associated with the particular buyer profile 138.

Additionally, in some examples, due to the high level of confidence calculated by the order prediction module 130 based at least in part on the high regularity of the latte purchase indicated by analyzing the buyer information 132 and the merchant information 134 (e.g., over a 90% regular purchase time and location), the order information 142 may include a pre-payment for the latte together with the order and pickup time of 6:00 am. The service provider module 102 may also send a message 104 to the buyer device 108 indicating to the buyer 110, that the service provider module 102 has purchased the buyer's morning latte and that the latte will be available at the first merchant's establishment or other POS location at 6:00 am.

As an alternative example, suppose that the order prediction module 102 determines, from the buyer information 132 and the merchant information 134, that the buyer 110 purchases a latte between 5:59 am and 6:11 am 67% of the time when the day is a weekday and 0.1% of the time when the day is a weekend. Further, the order prediction module 102 may determine that the buyer 110 purchases the latte from a first merchant POS device 112 98% of the time and from a second merchant POS device 112 2% of the time. In this example, the order prediction module 102 may determine, with a fair degree of confidence, that the buyer 110 plans to place an order for a latte near 6:00 am on Monday through Friday from the first merchant POS device 112. In this example, since the confidence in the regular purchase is lower, the service provider module 102 may send the message 104 to the buyer 110 prior to placing the order. For instance, in response to receiving the message, the buyer application 114 may notify the buyer 110 and request that the buyer confirm the order by selecting the purchase virtual control 122 or cancel the order by selecting the cancel virtual control 124.

In the illustrated example, the service computing device 106 hosting the service provider module 102 may be able to communicate the order information 142 to the merchant POS device 112 over one or more networks 144. Further, each of the merchant POS devices 112 may include an instance of a merchant application 146 that executes on a respective merchant POS device 112. The merchant application 146 and/or merchant POS devices 112 may provide payment functionality to enable the merchant 111 to accept payments from the buyer 110. For example, the merchant POS devices 112 or merchant application 146 may accept payments via one or more payment cards 148 associated with the buyer 110. In other examples, the merchant POS devices 112 may accept payments via the service provider module 102 on behalf of the buyer 110, or via the buyer application 114 on the buyer device 108.

In the illustrated example, networks 116 and 144 are depicted as separate or individual networks. In some instances, this may be the case, such as when the network 116 is a data network for sending text messages, emails, or other non-voice based messages 104 to the buyer device 108 and the network 144 is a voice network used to call in an order with one or more of the merchant POS devices 112. However, in other instances, the networks 116 and 144 may be the same.

In some cases, the merchant 111 may correspond to a store, establishment, or other place of business that may be at a fixed physical location and that typically does not change on a day-to-day basis. In other cases, a POS location associated with the merchant 111 may change from time to time, such as in the case that the merchant 111 operates a food truck, is a street vendor, a cab driver, etc., or has an otherwise mobile business, e.g., in the case of merchants who sell items at buyer's homes, places of business, and so forth. As used herein, a merchant may include any business engaged in the offering of goods or services for acquisition by buyers in exchange for compensation received from the buyers. Actions attributed to a merchant herein may include actions performed by employees or other agents of the merchant and, thus, no distinction is made herein between merchants and their employees unless specifically discussed. In addition, as used herein, a buyer may include any entity that acquires goods or services from a merchant, such as by purchasing, renting, leasing, borrowing, licensing, or the like. Hereinafter, goods and/or services offered by merchants may be referred to as items. Thus, a merchant and a buyer may interact with each other to conduct a transaction in which the buyer acquires one or more items from a merchant, and in return, the buyer provides payment to the merchant.

In general, the order prediction module 130 evaluates and/or analyzes the buyer information 132 and/or the merchant information 134 to schedule orders and make recommendations to the buyer 110. In some cases, the buyer information 132 may be collected in part from the buyer device 108 and/or the buyer application 114 operating on the device 108. For example, when the buyer 110 accepts an order, selects the purchase virtual control 122, and/or selects the cancel virtual control 124 via the buyer application 114, the purchase information (e.g., either order accepted, order purchased, or order canceled, price, tax, number and identification of items selected, merchant identification, merchant location, etc.) may be communicated to the service provider module 102 together with the time and date information as the buyer information 132 and may be associated with the corresponding buyer profile 138. In other examples, the buyer application 114 may detect or receive information from other applications operating on the buyer device 108 and transmit this information as part of the buyer information 132 sent to the service provider module 102. For instance, the buyer 110 may complete a purchase transaction using another application (e.g., an app store or online shopping application) and the purchase information may be received by the buyer application 114 and communicated to the service provider module 102.

In other examples, the buyer information 132 and/or the merchant information 134 may be received from one or more of the merchant POS devices 112. For example, assume that the buyer 110 is conducting a transaction with the merchant POS device 112 to purchase an item at the merchant's establishment. The merchant POS device 112 may complete the transaction with the buyer 110. For instance, the buyer 110 may purchase one or more items using a payment card 148 and the merchant POS device 112 may process the transaction with a financial institution associated with the payment card 148. In some examples, the service provider module 102 may process the transaction for the merchant POS device, such as by forwarding the payment card information to an associated card network (e.g., Visa®, MasterCard®, Discover®, etc.), may receive authorization information from the card network, and may forward the authorization information to the merchant POS device 112.

In some cases, the merchant POS device 112 may have the merchant application 146 installed. The merchant application 146 may be configured to process a transaction associated with the buyer 110, for example by receiving information from a payment card having a card number associated with the buyer 110 and transmitting the transaction information 140 (e.g., amount of payment, payment card information, description of items purchased, merchant identification, merchant location, time and date of transaction, etc.) to the service provider module 102. Thus, the service provider module 102 is able to receive the buyer information 132 and the merchant information 134 at least in part from the transaction information 140, and may analyze this information to generate the messages 104, the scheduling of appointments, pre-ordering of items, and pre-purchases of items on behalf of the buyer 110.

Figure 2:
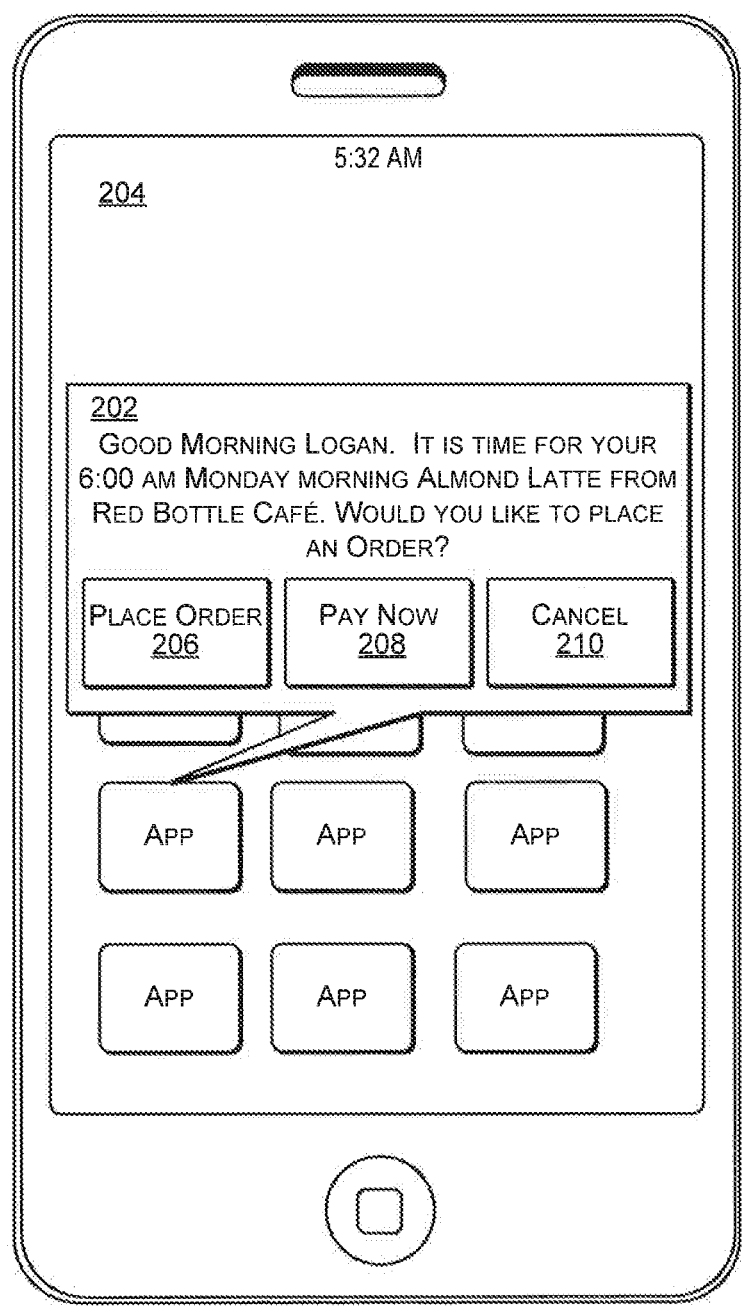
FIG. 2 illustrates an example user interface presented on an example buyer device according to some implementations.

FIG. 2 illustrates an example buyer device 200 presenting a notification in a user interface, such as may be presented by the buyer application according to some implementations. In the illustrated example, assume that it is 5:32 am on Monday morning and that a buyer, such as buyer 110 of FIG. 1, is getting ready for work and plans to pick up a latte on the way. In this example, the buyer device 200 receives a message from a service provider module, such as service provider module 102 of FIG. 1, operating on one or more remote computing devices of the service provider. The message includes an indication that the service provider module has determined that it is likely that the buyer plans to stop at the buyer's regular beverage merchant "Red bottle Café" around 6:00 am to pick up the buyer's Monday morning latte.

In response to receiving the message from the service provider module, the buyer device 200 presents the message to the buyer, such as a notification 202. In some implementations, the notification 202 may include a generic device vibration, a particular vibration pattern associated with the buyer application, a generic device notification or message sound, or a particular sound associated with the buyer application, presenting an icon associated with the buyer application on a message bar along the margin of the device display 204, highlighting or animating the buyer application on the display 204, or a combination thereof. In the illustrated example, the notification 202 includes a pop-up or overlay that includes textual content (e.g., a message describing the message to the buyer) and one or more selectable virtual controls such a place order control 206, a pay now control 208, and a cancel order control 210 depicted in the illustrated example.

For instance, in the illustrated example, the notification 202 is presented on the display 204 over the other background and foreground applications such that the buyer may make a quick determination with as few as one input or, in some instances, without making any selections, as will be describe below with respect to FIG. 3. In this example, the textual content "Good Morning Logan. It is time for your 6:00 am Monday morning almond Latte from Red bottle Café. Would you like to place an order?" is presented with the notification 202 on the display 204 of the buyer device 200. For instance, the notification 202 may include or may be included in a graphic user interface having the virtual controls 206-210 to provide the buyer with virtual controls to place the order, pay now, and/or cancel the order, respectively. By presenting the notification 202 in this manner, the buyer is quickly able to determine the pickup time (e.g., 6:00 am), the merchant or location associated with the order (e.g., Red Bottle Café), and the item (e.g., the almond latte) without having to open the buyer application or select one or more virtual controls.

In the illustrated example, the notification 202 presents the buyer with a virtual control to place an order 206, purchase the order, i.e., pay now 208, and/or to cancel 210. In this example, the service provider module may have calculated a confidence rating that is above a first threshold to notify the buyer that it is time to place the order but below a second threshold to place the order on behalf of the buyer. For instance, the confidence rating may be above 50% but below 75% that the buyer actually intends to pick up his or her coffee. In other words, the service provider module may have enough confidence to send the message to the buyer device 200 but not enough confidence to actual pre-order or pre-purchase the latte on behalf of the buyer. When calculating the confidence rating the service provider module may analyze any number of factors related to the buyer, such as regularity of purchase, time of day, time of year, day of the week, buyer's current location (if detectable), buyer's recent purchases, current weather conditions, current local events, the buyer's appointment calendar, and so forth.

In one example, assume the buyer is planning to pick up his or her latte at Red bottle Café on the way to work at approximately 6:00 am. In this example, the buyer may select the "place order" virtual control 206 to cause the service provider module to place the order with Red bottle Café for pickup and in-store payment at 6:00 am. Alternatively, the buyer may select the "pay now" virtual control 208 to cause the service provider module to both place the order with Red bottle Café, as well as complete the transaction or tender payment to Red bottle Café on behalf of the buyer. In this alternative example, the buyer may avoid lines associated with ordering coffee in the morning hours as the merchant (e.g., Red bottle Café) has already received both the buyer's order and payment. Thus, the buyer is able to arrive at Red bottle Café and pick up his or her order, for instance, from a pickup area or line. As one example, the service provider may cause the buyer application to present a bar code or other payment confirmation on the display 204 that can be scanned by the merchant as confirmation that the buyer is the correct buyer, the buyer has picked up the item, and payment has been made to the merchant by the service provider on the behalf of the buyer.

In another example, assume the buyer is on vacation, or is otherwise traveling, and does not plan on going to work or stopping at Red bottle Café for his or her morning latte. In this example, the buyer may select the "cancel" virtual control 210 to prevent the service provider module from placing an order for the almond latte with the Red bottle Café on behalf of the buyer. In some instances, the buyer application may request additional information related to the canceled order or may provide alternative recommendations. For example, the buyer application may ask the buyer if the buyer would like to order another item from Red bottle Café, such as an iced coffee. In some cases, the alternative items may be selected from a list of other items the buyer has purchased from Red bottle Café and/or based at least in part on other information, such as the time of year or weather information (e.g., offer an iced coffee when it is over 90 degrees Fahrenheit outside), items purchased most frequently by a group of buyers determined to be similar to the particular buyer with respect to buying habits, demographics, and so forth. In other cases, alternative merchants from which the buyer may obtain the almond latte may be suggested, such as based on calendar appointments, current location information obtained from the buyer device (e.g., if the buyer is on vacation in Florida, the service provider application may identify a merchant similar to Red bottle Café and recommend the similar merchant to the buyer).

Figure 3:
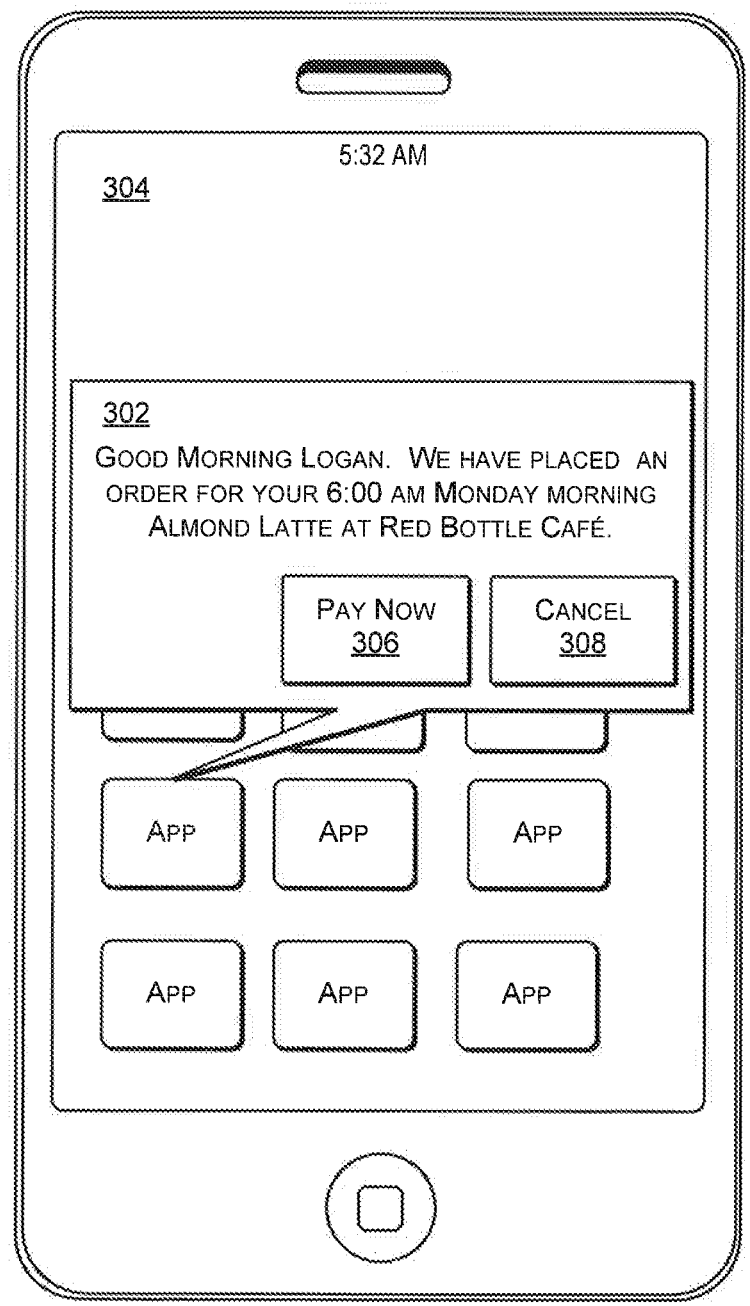
FIG. 3 illustrates another example user interface presented on the example buyer device according to some implementations.

FIG. 3 illustrates an example buyer device 300 presenting a notification in a user interface, such as may be presented by the buyer application according to some implementations. In the illustrated example, assume that it is 5:32 am on Monday morning and that a buyer, such as buyer 110 of FIG. 1, is getting ready for work and plans to pick up a latte on the way. In this example, the buyer device 300 receives a message from a service provider module, such as service provider module 102 of FIG. 1, operating on one or more remote computing devices. As discussed above with respect to FIG. 2, the message includes an indication that the service provider module has determined that it is likely that the buyer plans to stop at the buyer's regular beverage merchant "Red bottle Café" around 6:00 am to pick up the buyer's Monday morning latte. However, in the illustrated example, the service provider module has determined that it is more likely that the buyer will pick up a latte from Red bottle Café than in the example illustrated with respect to FIG. 2, and has already placed the order for the almond latte with Red bottle Café prior to the buyer viewing the notification 302.

In general, in response to receiving the message from the service provider module, the buyer device 300 issues the notification 302 related to the message to the buyer. As discussed above, in some implementations, the notification 302 may include a generic device vibration, a particular vibration pattern associated with the buyer application, a generic device notification or message sound, or a particular sound associated with the buyer application, presenting an icon associated with the buyer application on a message bar along the margin of the device display 304, highlighting or animating the buyer application on the display 304, or a combination thereof. In the illustrated example, the notification 302 includes a pop-up or overlay that includes textual content (e.g., a message describing the message to the buyer) and one or more selectable virtual controls, such a pay now virtual control 306, and a cancel order virtual control 308 depicted in the illustrated example.

For instance, in the illustrated example, the notification 302 is presented on the display 304 over the other background and foreground applications such that the buyer may make a quick without making any selections. In this example, the textual content "Good Morning Logan. We have placed an order for your 6:00 am Monday morning almond Latte at Red Bottle Café." is displayed to the buyer with the virtual controls to pay now 306 and/or cancel 308.

Unlike, the example illustrated above with respect to FIG. 2, if the buyer desires to pick up the latte and pay in the store, the buyer needs take no action with respect to the notification 302. For instance, the service provider module may have calculated a confidence rating that is above a first threshold to notify the buyer that it is time to place the order, above a second threshold to place the order on behalf of the buyer, but below a third threshold to pre-purchase the item on behalf of the buyer. For example, the confidence rating may be above 75% but below 95% or in a range that the service provider module is confident the buyer will pick up the almond latte but not confident enough to pre-pay for the latte.

In one example, assume the buyer is planning to pick up his or her latte at Red bottle Café on the way to work near 6:00 am. In this example, the buyer may view the notification 302 and move on with his or her day as the order has already been placed. Alternatively, the buyer may select the pay now virtual control 306 to cause the service provider module both place the order with Red bottle Café as well as complete the transaction or render payment to Red bottle Café on behalf of the buyer. In this alternative example, the buyer may avoid lines associated with ordering coffee in the morning hours as the merchant (e.g., Red bottle Café) has already received both the buyer's order and payment. Thus, the buyer is able to arrive at Red bottle Café and pick up his or her order, for instance, from a pickup area or line.

In another example, assume the buyer has switched the black coffee as his or her morning drink of choice and does not want the almond latte. In this example, the buyer may select the cancel virtual control 308 to cause the service provider module to notify the merchant that the order was canceled and should not be fulfilled. In some instance, the buyer application may request additional information related to the canceled order or provide alternative recommendations. For example, the buyer application may ask the buyer if the buyer would like to order another item from Red bottle Café such as a regular coffee. In some cases, the alternative items may be based at least in part on the buyer information and the selection of the cancel virtual control 308. For instance, the service provider module may determine a growing trend of the buyer canceling the almond latte and instead purchasing a black coffee.

Figure 4:
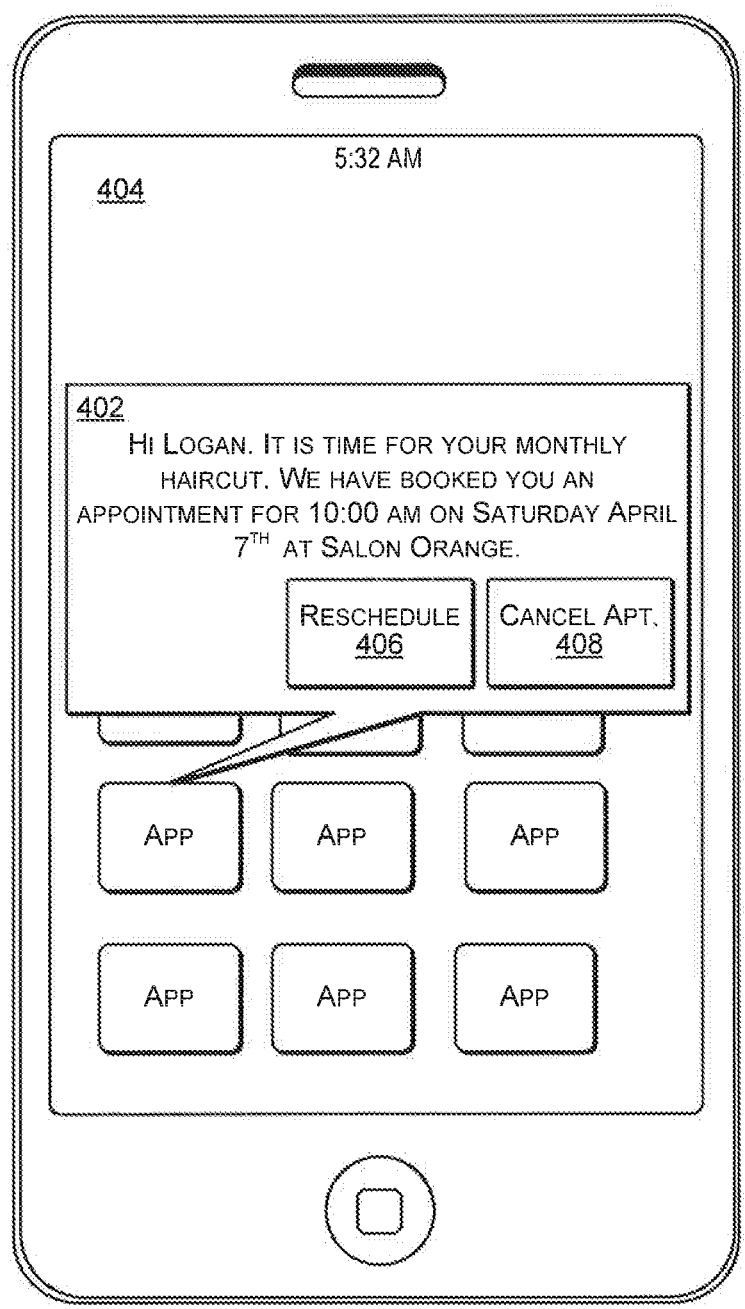
FIG. 4 illustrates another example user interface presented on the example buyer device according to some implementations.

FIG. 4 illustrates an example buyer device 400 presenting a notification in a user interface, such as may be presented by the buyer application according to some implementations. In the illustrated example, assume that it is time for a buyer, such as buyer 110 of FIG. 1, to get the buyer's monthly haircut. In this example, the buyer device 400 receives a message from a service provider module, such as service provider module 102 of FIG. 1, operating on one or more remote computing devices. In this example, the message includes an indication that the service provider module has determined that it is likely that the buyer plans to get a haircut at "Salon Orange" on the upcoming weekend and the service provider module has contacted the Salon Orange and booked the buyer an appointment for Saturday at 10:00 am. In some cases, the service provider module may select the appointment date and time based in part on having access to the buyer's calendar via the buyer device 300. For instance, the service provider module may note that the buyer has an open time slot before 11:00 am on Saturday and select 10:00 am as the appointment time to provide the buyer with sufficient time In general, in response to receiving the message from the service provider module, the buyer device 400 issues the notification 402 related to the message to the buyer. As discussed above, in some implementations, the notification 402 may include a generic device vibration, a particular vibration pattern associated with the buyer application, a generic device notification or message sound, or a particular sound associated with the buyer application, presenting an icon associated with the buyer application on a message bar along the margin of the device display 404, highlighting or animating the buyer application on the display 404, or a combination thereof. In the illustrated example, the notification 402 includes a pop-up or overlay that includes textual content (e.g., a message describing the message to the buyer) and one or more selectable virtual controls, such a reschedule virtual control 406 and a cancel appointment virtual control 408 depicted in the illustrated example.

For instance, in the illustrated example, the notification 402 is presented on the display 404 over the other background and foreground applications such that the buyer may make a quick without making any selections. In this example, the textual content "Hi Logan, it is time for your monthly haircut. We have booked you an appointment for 10:00 am on Saturday April 7th at Salon Orange" is displayed to the buyer with the virtual controls to reschedule 406 and/or "cancel" 408 to cancel the appointment. In this manner, the buyer is able to quickly note that his or her or her haircut appointment has been scheduled, the time of the appointment, and the buyer may be provided with the opportunity to reschedule if necessary.

Figure 5:
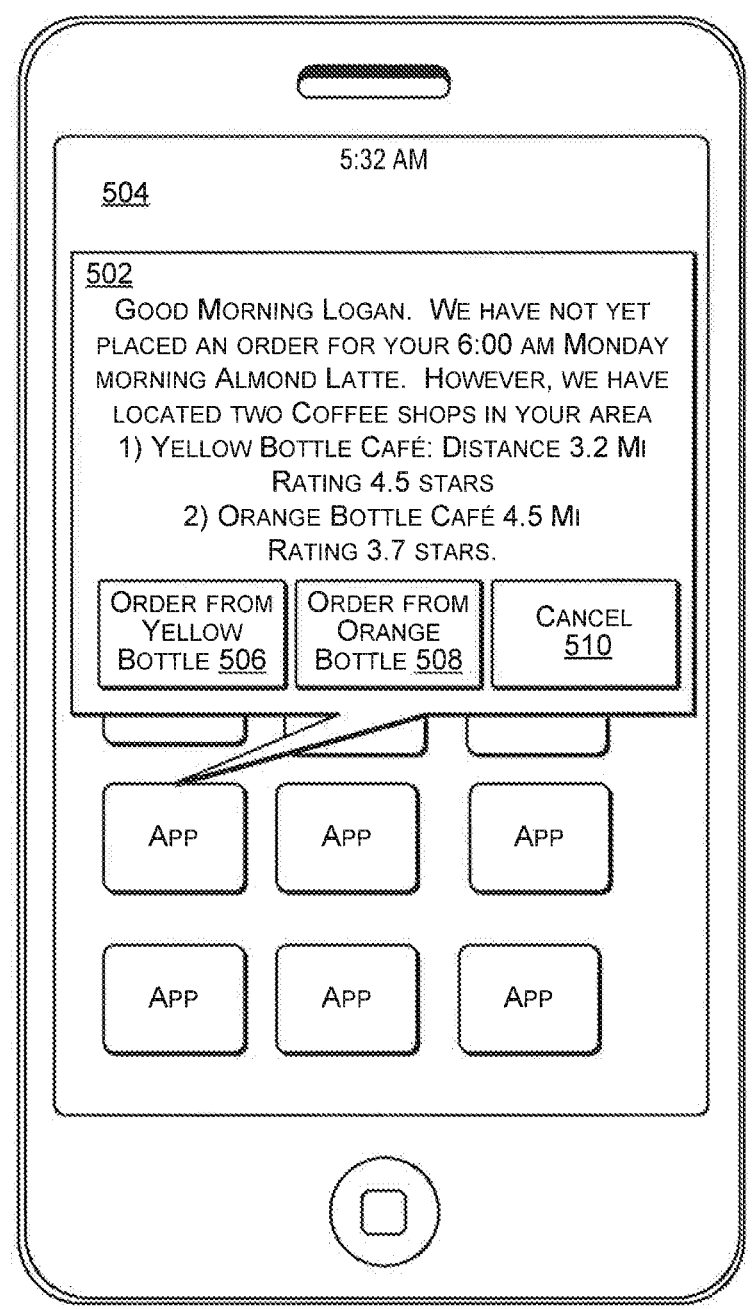
FIG. 5 illustrates another example user interface presented on the example buyer device according to some implementations.

FIG. 5 illustrates an example buyer device 500 presenting a notification in a user interface, such as may be presented by the buyer application according to some implementations. In the illustrated example, assume that it is 5:32 am on Monday morning and that a buyer, such as buyer 110 of FIG. 1, is getting ready for work, plans to pick up a latte on the way, but has been traveling. In this example, the buyer device 500 receives a message from a service provider module, such as service provider module 102 of FIG. 1, operating on one or more remote computing devices. Unlike FIGS. 2 and 3 above, the service provider module may note that the buyer is not in the buyer's typical Monday morning location, for instance, via GPS data or cell tower data provided by the buyer device 500. However, in the illustrated example, the service provider module may still determine that the buyer would like the buyer's Monday morning latte. In this example, the service provider module may locate alterative cafe's and issue a message asking the buyer if the buyer would like to purchase the Monday morning latte from either location. For instance, in the illustrated example, the service provider module located both the Yellow Bottle Café and the Orange Bottle Café and provided a message to the buyer that both are within a 4 mile radius of the buyer's location, are similar to Red bottle Café (the buyer's typical merchant), have an acceptable rating (e.g., above three stars) and carry the almond latte that the buyer enjoys.

In general, in response to receiving the message from the service provider module, the buyer device 500 issues the notification 502 related to the message to the buyer. As discussed above, in some implementations, the notification 502 may include a generic device vibration, a particular vibration pattern associated with the buyer application, a generic device notification or message sound, or a particular sound associated with the buyer application, presenting an icon associated with the buyer application on a message bar along the margin of the device display 504, highlighting or animating the buyer application on the display 504, or a combination thereof. In the illustrated example, the notification 502 includes a pop-up or overlay that includes textual content (e.g., a message describing the message to the buyer) and one or more selectable virtual controls, such as order from Yellow Bottle Café virtual control 506, order from Orange Bottle Café virtual control 508, and a cancel order virtual control 510 as depicted in the illustrated example.

For instance, in the illustrated example, the notification 502 is presented on the display 504 over the other background and foreground applications such that the buyer may make a quick without making any selections. In this example, the textual content "Good Morning Logan. We have not yet placed your order for your 6:00 am Monday morning Almond Latte. However, we have located two Coffee shops in your area 1) Yellow Bottle Café: Distance 3.2 Mi Rating 4.5 stars 2) Orange Bottle Café 4.5 Mi Rating 3.7 stars," is displayed to the buyer with the virtual controls to order from Yellow Bottle Cafe 506, order from Orange Bottle Café, and/or cancel 510. Unlike, the example illustrated above with respect to FIG. 3, the service provider module may have calculated a first confidence rating related to the buyer's desire to purchase an almond latte. For example, the first confidence rating may indicate a confidence that is above a first threshold to notify the buyer that it is time to place the order. However, the service provider module may have calculated a second confidence rating that is below a second threshold related to the merchant the buyer plans to visit (e.g., due to the change in location). For example, the first confidence rating may be above 75% while the second confidence rating may be below 75%.

In some implementations, the notification 502 may provide the buyer with additional information related to Yellow Bottle Café and/or Orange Bottle Café. For instance, the message and the notification 502 may provide a map showing the buyer's location and the location of both Café s and/or a link to map or another application on the buyer device 500 that may provide the location information in a graphical format. In other instances, the message and the notification 502 may provide one or more customer review in addition to the star ratings related to each of the café s. In some particular examples, the message and notification 502 may provide virtual controls to purchase alternative items, for example, one or more of the top selling items at each of the alternative café s.

In the illustrated example, the service provider module located two café s in the buyer's vicinity and provided a message listing both. However, in some cases, the service provider module may locate many more suitable merchants in the buyer's vicinity. In these cases, the service provider module may provide a list of all the suitable merchants and/or a subset of the suitable merchants. For instance, the service provider module may eliminate each merchant having a rating below a quality threshold (e.g., below a three star rating) as the buyer information may indicate the buyer rarely visits or re-visits merchants having below a three star rating.

In other example, the service provider module may implement a price threshold (either high or low), a time threshold (e.g., how long has the merchant been in business), a similarity threshold (e.g., how similar is the merchant to the buyer's typical merchant for this item), a distance threshold (e.g., how far is the merchant's location from the buyer's location or how far is the merchant's location from a known destination associated with the buyer), among others. In some implementations, the service provider module may rank or rate the merchants identified within the buyer's vicinity, for instance based on the thresholds discussed above, and present the highest ranking or rated subset.

Figure 6:
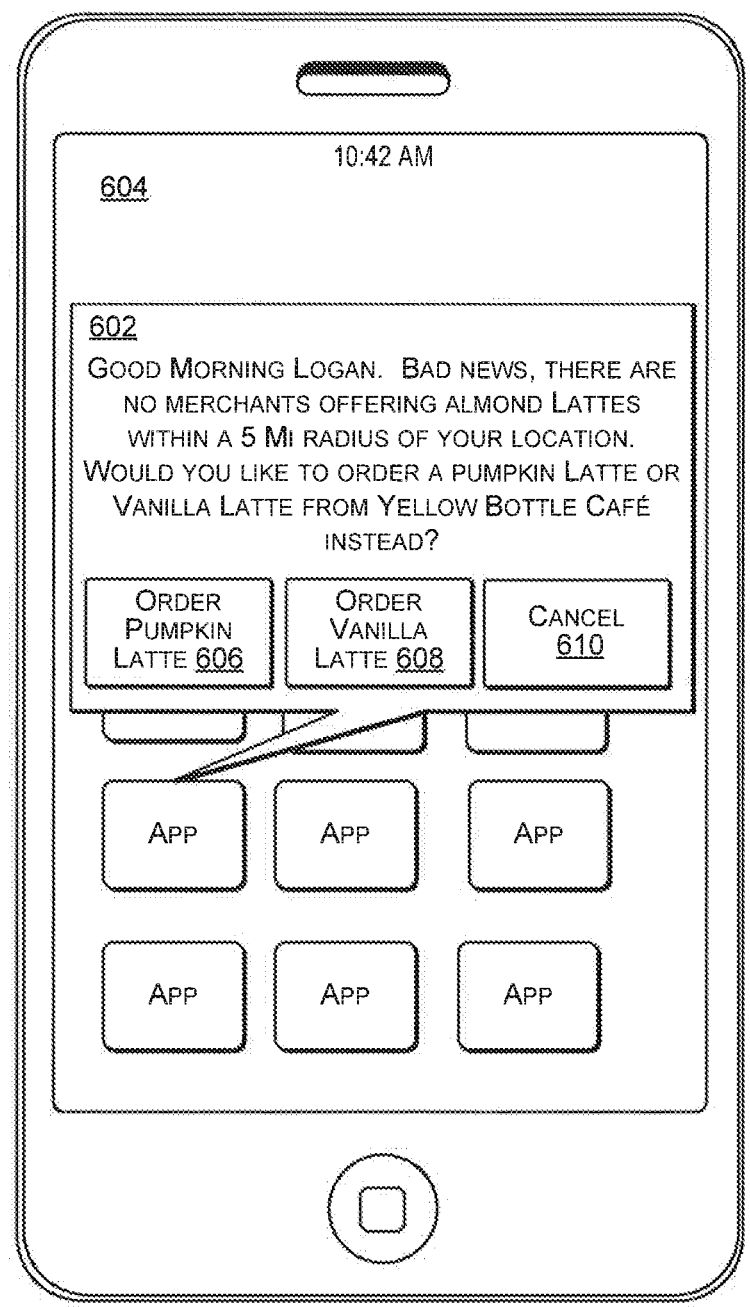
FIG. 6 illustrates another example user interface presented on the example buyer device according to some implementations.

FIG. 6 illustrates an example buyer device 600 presenting a notification in a user interface, such as may be presented by the buyer application according to some implementations. In the illustrated example, assume that it is 5:32 am on Monday morning and that a buyer, such as buyer 110 of FIG. 1, is getting ready for work, plans to pick up a latte on the way, but has been traveling, as discussed above with respect to FIG. 5. In this example, the buyer device 600 receives a message from a service provider module, such as service provider module 102 of FIG. 1, operating on one or more remote computing devices. Unlike FIG. 5 above, the service provider module may have been unable to identify a merchant within the vicinity of the buyer (e.g., a five-mile radius) that carries an almond latte (e.g., the buyer's morning drink of choice). However, in the illustrated example, the service provider module may still determine that the buyer would like a caffeinated beverage before starting the buyer's day.

In this example, the service provider module may locate alterative café's and issue a message asking the buyer if the buyer would like to purchase an alternative item similar to the buyer's typical item. For instance, in the illustrated example, the service provider module located the Yellow Bottle Café within a 5 mile radius of the buyer's location that is similar to Red bottle Café (the buyer's typical merchant), has an acceptable rating, and carries two item similar to the almond latte that the buyer enjoys.

In general, in response to receiving the message from the service provider module, the buyer device 600 issues the notification 602 related to the message to the buyer. As discussed above, in some implementations, the notification 602 may include a generic device vibration, a particular vibration pattern associated with the buyer application, a generic device notification or message sound, or a particular sound associated with the buyer application, presenting an icon associated with the buyer application on a message bar along the margin of the device display 604, highlighting or animating the buyer application on the display 604, or a combination thereof. In the illustrated example, the notification 602 includes a pop-up or overlay that includes textual content (e.g., a message describing the message to the buyer) and one or more selectable virtual controls, such as a virtual control 606 to order a pumpkin latte, a virtual control 608 to order a vanilla latte, and a virtual control 610 to cancel the order, as depicted in the illustrated example.

For instance, in the illustrated example, the notification 602 is presented on the display 604 over the other background and foreground applications such that the buyer may make a quick without making any selections. In this example, the textual content "Good Morning Logan. Bad news there are no merchants selling Almond Lattes within a 5 Mi radius of your location. Would you like to order a Pumpkin Latte or Vanilla Latte from Yellow Bottle Café instead?" is displayed to the buyer with the virtual controls to order a pumpkin latte 606, a vanilla latte 608, and/or cancel 610. In some implementations, the service provider module may provide a first message to the buyer device 600 allowing the buyer to select a location different from the buyer's customary merchant (e.g., Red bottle Café), as discussed above with respect to FIG. 5, and based on the merchant selected by the buyer provide a second message related to the items available (e.g., the pumpkin latte and the vanilla latte).

In some instances, the service provider module may select the items based on one or more confidence ratings. For example, the service provider module may rate the alternative items based on how often the buyer has purchased the alternative items, how similar the alternative items are to the original item, similarity of price between the alternative items and the original items, seasonality of the alternative items and the original items, among others. In some cases, the service provider model may select the alterative items for inclusion in the message based on the rating.

In some implementations, the notification 602 may provide the buyer with additional information related to the alterative items. For instance, the message and the notification 602 may provide the price, the rating calculated for each item, one or more reasons why the service provider module selected the alternative items, information obtained from the merchant about the alterative items, among others. In some instances, the message and the notification 602 may provide one or more customer review or customer ratings related to each of the alterative items to help the buyer make an informed on the spot decision.

In the illustrated example, the service provider module determined, based on the offerings of the local merchant's, two alternative items that the buyer may enjoy as an alternative to the almond latte. For instance, if the local merchants participate in the payment service provided by the service provider, the service provider module may access a list of the items offered for sale by each local merchant, and may search these lists to attempt to locate the item regularly purchased by the buyer. Thus, the service provider module may initially examine the offerings of local merchants that are classified in a same merchant category as the merchant from which the buyer regularly purchases the item. Further, if the service provider module is unable to locate the item from the offerings of local merchants that participate in the payment service, the service provider module may access websites or other online menus of local merchants within a threshold distance of the buyer to attempt to locate the item regularly purchased by the buyer.

If the service provider module determines that the item that the buyer regularly purchases is not offered by the local merchants within a threshold distance of the buyer, the service provider module may determine one or more alternative items that may be substituted for the regularly purchased item. As one example, the service provider module may determine one or more alternative items based on the buyer profiles of buyers that are similar to the particular buyer. For example, the service provider module may determine a subset of buyer profiles from the plurality of buyer profiles that are similar to the particular buyer in buying habits, demographics, and so forth, and may identify alternative items most commonly purchased by the members of the subset in a same item category as the item that the particular buyer regularly purchases. The service provider module may then determine which local merchants offer one or more of these alternative items, and may send a message to the buyer device associated with the buyer to offer to place an order with a local merchant on the buyer's behalf.

In some cases, the service provider module may locate many more suitable alterative items in the buyer's vicinity that are available from one or more merchants. In these cases, the service provider module may provide a list of all the suitable items and/or a subset of the suitable items. For instance, the service provider module may eliminate the items associated with each merchant having a rating below a quality threshold (e.g., below a three star rating), above a price threshold, below a similarity threshold, items associated with a merchant greater than a distance threshold, among others. In some implementations, the service provider module may rank the items in addition to or in lieu of rating the items to identify which alternative items should be included in the message and the notification 602. For example, the service provider module may select up to a predetermined number of items having the highest ranking.

Figure 7:
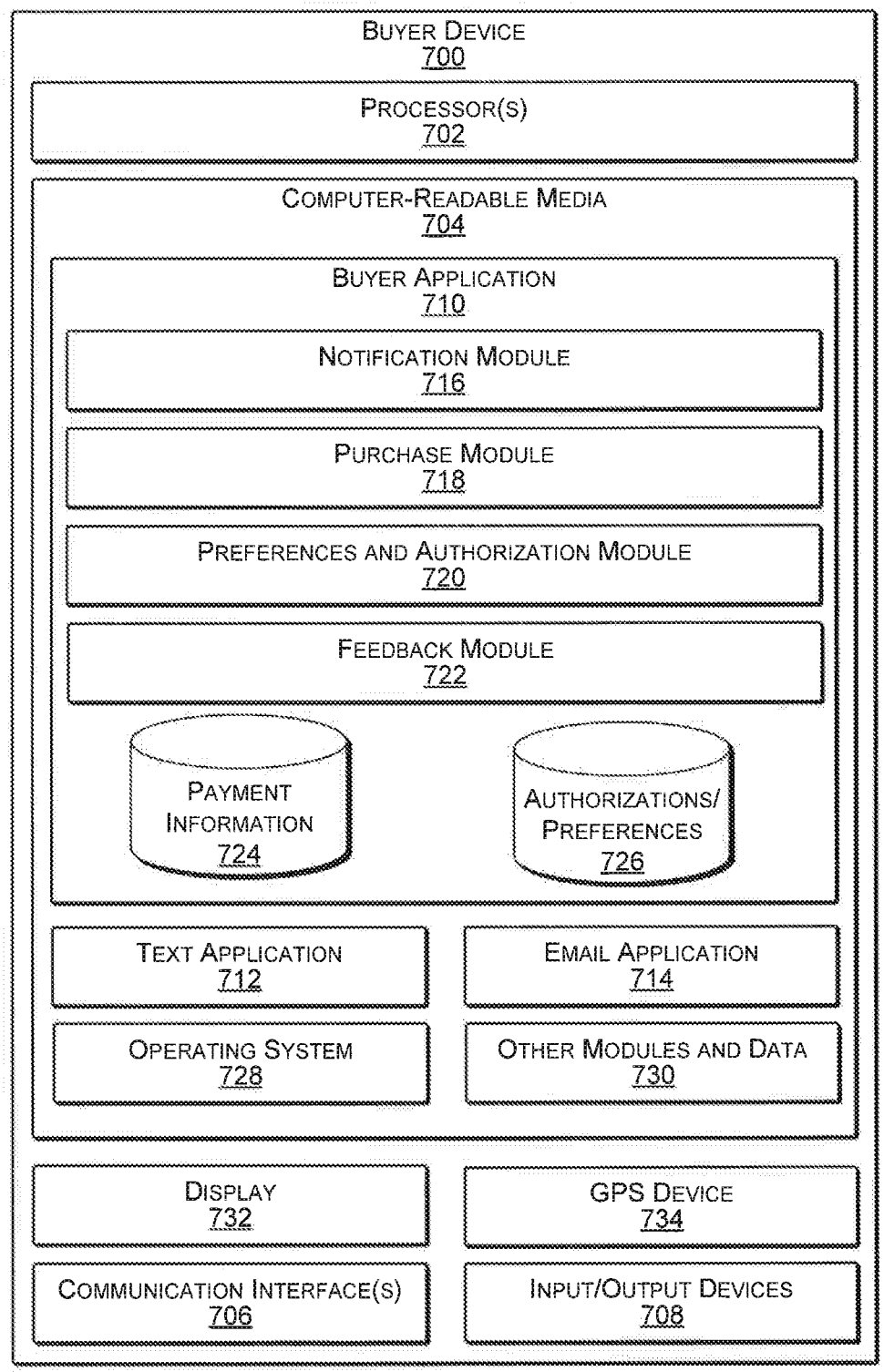
FIG. 7 illustrates select components of an example buyer device according to some implementations.

FIG. 7 illustrates select components of an example buyer device 700 according to some implementations. The buyer device 700 may be any of a number of different types of portable computing devices. Some examples of the buyer device 700 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 7, the buyer device 700 includes components such as at least one processor 702, one or more computer-readable media 704, the one or more communication interfaces 706, and one or more input/output (I/O) devices 708. Each processor 702 may itself comprise one or more processors or processing cores. For example, the processor 702 can be implemented as one or more microprocessors, microcomputers, microcontrollers, digital signal processors, central processing units, state machines, logic circuitries, and/or any devices that manipulate signals based on operational instructions. In some cases, the processor 702 may be one or more hardware processors and/or logic circuits of any suitable type specifically programmed or configured to execute the algorithms and processes described herein. The processor 702 can be configured to fetch and execute computer-readable processor-executable instructions stored in the computer-readable media 704.

Depending on the configuration of the buyer device 700, the computer-readable media 704 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 704 may include, but is not limited to, RAM, ROM, EEPROM, flash memory, solid-state storage, magnetic disk storage, optical storage, and/or other computer-readable media technology. Further, in some cases, the buyer device 700 may access external storage, such as RAID storage systems, storage arrays, network attached storage, storage area networks, cloud storage, or any other medium that can be used to store information and that can be accessed by the processor 702 directly or through another computing device or network. Accordingly, the computer-readable media 704 may be computer storage media able to store instructions, modules or components that may be executed by the processor 702. Further, when mentioned, non-transitory computer-readable media exclude media such as energy, carrier signals, electromagnetic waves, and signals per se.

The computer-readable media 704 may be used to store and maintain any number of functional components that are executable by the processor 702. In some implementations, these functional components comprise instructions or programs that are executable by the processor 702 and that, when executed, implement operational logic for performing the actions and services attributed above to the buyer device 700. Functional components of the buyer device 700 stored in the computer-readable media 704 may include the buyer application 710, as discussed above with respect to FIGS. 1-6, a text application 712, and/or an email application 714. In this example, the buyer application 710 includes a notification module 716 and a purchase module 716, as discussed above with respect to FIG. 1.

For example, the notification module 716 may be configured to notify the buyer to messages received from the service provider module. In some instances, the notification module 716 may cause the buyer device 700 to generate a visual, audio, and/or physical alert to inform the buyer that the message was received. For example, the buyer device 700 may display information, emit an audible tune, or vibrate. In some examples, the notification module 716 may cause the buyer application 702 to become the active application on the buyer device 700 in order to present the message and/or one or more selectable virtual controls related to the message to the buyer. In other examples, the buyer application 702 may continue to operate as a background application, while the notification module 716 may causes the message to be displayed on the buyer device 700 as a pop-up or overlay window.

The purchase module 718 may be configured to present the buyer with one or more virtual controls to purchase or to complete the transaction related to the message. For example, the purchase module 718 may present the buyer with a purchase virtual control to allow the buyer to authorize the service provider module to tender payment to a merchant identified in the message. In other examples, the purchase module 718 may include one or more virtual controls to allow the buyer to authorize the service provider module to place the order but not necessarily to complete the payment. In some cases, the purchase module 718 may allow the buyer to grant temporary authorization to the service provider module to conduct transactions on behalf of the buyer, while in other cases, the purchase module 718 may allow the buyer to grant permanent authorizations.

Additionally, in the illustrated example, the buyer application 710 includes a preference and authorization module 720 and a feedback module 722, in addition to storing payment information 724 and authorizations and preferences 726. For example, the preference and authorization module 720 may allow the buyer to set various preferences and authorizations 726 related to recommending merchants, items, and/or services to the buyer. As an example, the preference and authorization module 720 may allow the buyer to set one or more thresholds related to the confidence rating, such as the minimum confidence require to place an order, purchase an item, schedule an appointment, among others. In another example, the preference and authorization module 720 may allow the buyer to set minimum ratings related to recommended items and/or services, distances of travel when recommending merchants, authorizations to tender payment to one or more merchants or related to one or more items and/or services, number of recommendations, orders, or automatic purchases per day, maximum dollar amount to spend on pre-purchased items and/or services, among others.

The feedback module 722 may collect data related to the purchases, activities, and/or preference of the buyer. For example, the feedback module 722 may provide data related to each of the buyer's virtual control selections in response to a notification back to the service provider module via the communication interfaces 706. In some implementations, the feedback module 722 may query the buyer for additional information related to a particular decision or purchase to aid the service provider module in better understanding the rationale behind the buyer's actions, as well as to improve the overall recommendation and message process. In other implementations, the feedback module 722 may be linked or connected with other components or applications of the buyer device 700 to collect and provide data associated with the other components or application back to the service provider module to improve the recommendation and message process.

The buyer application 710 may also store or include payment information 724. For example, the payment information 724 may include data related to one or more payment cards, credit cards, bank accounts, checking accounts, savings accounts, etc. from which the purchase module 718 may select to complete a transaction or tender payment to one or more merchants according to the preferences and authorization 726 configured by the buyer via the preference and authorization module 720.

Additional functional components stored on the computer-readable media 704 may include an operating system 728 for controlling and managing various functions of the buyer device 700 and for enabling basic user interactions with the buyer device 700. In addition, the computer-readable media 704 may also store data, data structures and the like, that are used by the functional components. Depending on the type of the buyer device 700, the computer-readable media 704 may also optionally include other functional components and data, such as other modules and data 730, which may include applications, programs, drivers, etc., and the data used or generated by the functional components. Further, the buyer device 700 may include many other logical, programmatic and physical components, of which those described are merely examples that are related to the discussion herein.

The communication interface(s) 706 may include one or more interfaces and hardware components for enabling communication with various other devices, such as over the network(s) 116 and 144 of FIG. 1 or directly. For example, communication interface(s) 706 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 7 further illustrates that the buyer device 700 may include a display 732. Depending on the type of computing device used as the buyer device 700, the display may employ any suitable display technology. For example, the display 732 may be a liquid crystal display, a plasma display, a light emitting diode display, an OLED (organic light-emitting diode) display, an electronic paper display, or any other suitable type of display able to present digital content thereon. In some examples, the display 732 may have a touch sensor associated with the display 732 to provide a touchscreen display configured to receive touch inputs for enabling interaction with a graphic interface presented on the display 732. Accordingly, implementations herein are not limited to any particular display technology. Alternatively, in some examples, the buyer device 700 may not include a display.

The buyer device 700 may further include the one or more I/O devices 708. The I/O devices 708 may include speakers, a microphone, a camera, and various user controls (e.g., buttons, a joystick, a keyboard, a keypad, etc.), a haptic output device, and so forth. In some implementations, the display 732 and the I/O devices 708 may be combined, as described above, to form the touchscreen or touch enabled display.

Other components included in the buyer device 700 may include various types of sensors, which may include a GPS device 734 or other location tracking component able to indicate location information. In some cases, the GPS device 734, as well as other sensors (not shown), such as an accelerometer, gyroscope, compass, proximity sensor, and the like may provide data to the buyer device 700 and/or the buyer application 702. In some particular cases, the buyer application 702 may provide the senor data to a service provider module operation on one or more remote computing devices via the communication interfaces 706. Additionally, the buyer device 700 may include various other components that are not shown, examples of which include removable storage, a power source, such as a battery and power control unit, and so forth.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 8:
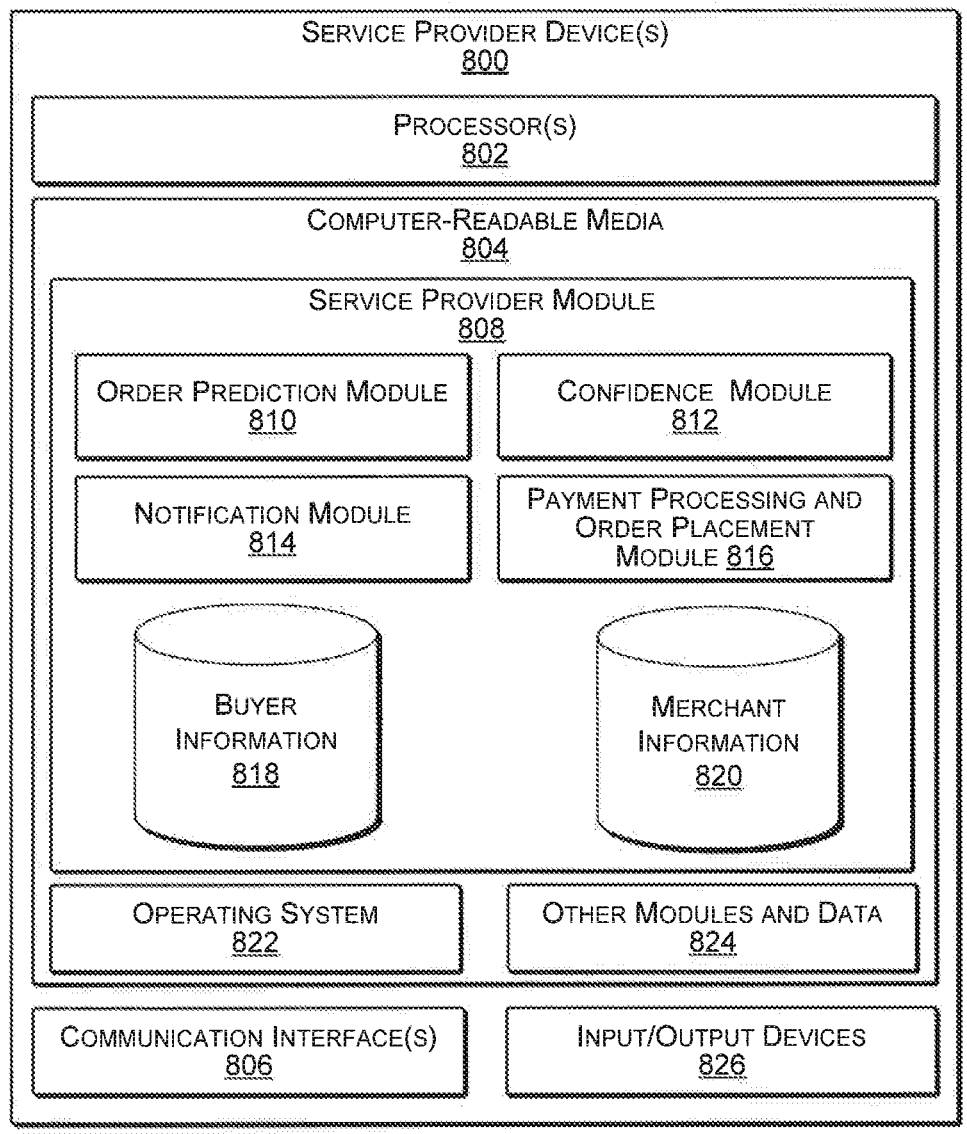
FIG. 8 illustrates select components of one or more example service computing devices according to some implementations.

FIG. 8 illustrates select components of the service provider device 800 that may be used to implement some functionality of the item recommendation and message service described herein. The service provider device 800 may be operated by a service provider that provides the payment service and the item and service order placement, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service provider device 800 as being present in a single location, these components and data may alternatively be distributed across different computing devices and different locations in any manner. Consequently, the functions may be implemented by one or more service computing devices, with the various functionality described above distributed in various ways across the different computing devices. Multiple service provider device 800 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each service provider device 800 may include one or more processors 802, one or more computer-readable media 804, and one or more communication interfaces 806. Each processor 802 may be a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service provider device 800, the computer-readable media 804 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed above to the service provider device 800. In the illustrated example, functional components stored in the computer-readable media 804 may include a service provider module 808 for identifying items and/or services, placing order for the items and/or services, and notifying the buyer of the orders placed. In general, the service provider module 808 may include additional modules for carrying out the order placement and message process. For example, the service provider module 808 may include an order prediction module 810, the confidence module 812, a message module 814, and a payment processing and order placement module 816, as well as buyer information 818 and merchant information 820 used in identifying merchants, items, services, to pre-order or purchase on behalf of individual buyers.

In general, the order prediction module 810 may access the buyer information 818 and/or the merchant information 820 to identify regular purchases made by the individual buyers, such as buyer 110 of FIG. 1. In some examples, the order prediction module 810 may identify items and/or services based at least in part on a number of re-occurring purchases (e.g., purchased more than three times a week), type of items/services (e.g., food and drink v. electronic device), time of year and day (e.g., work days v. weekend, summer items v. winter items, etc.), price and available discounts, among others.

In some implementations, once the order prediction module 810 identifies one or more items and/or services that the buyer regularly purchases on a re-occurring basis, the confidence module 812 may calculate one or more confidence ratings associated with placing an order for the items and/or services, pre-purchasing the items and/or services, recommending alternative merchants to the buyer, recommending alternative items and/or services to the buyer, and recommending complimentary or related items/services to the buyer. For example, the confidence module 812 may access the buyer information 818 and/or the merchant information 820 to calculate a confidence rating associated with the likelihood that a particular buyer will purchase a particular item, such as a morning latte, at a particular time. In some cases, the confidence rating may be re-calculated on an hour-by-hour basis, a day-by-day basis, a week-by-week basis, or other basis. For instance, the buyer may purchase different caffeinated drinks on different days of the week or may select from a group of three different caffeinated drinks on a regular basis. In this instance, the confidence rating may fluctuate based in part on the last item out of the group purchased and/or one or more identified trends, such as over the last ten days the buyer has been favoring one of the three drinks over the other two.

The message module 814 may provide a message to a buyer device associated with a particular buyer when the order prediction module 808 and/or the confidence module 812 identify one or more items or services to place an order for on behalf of the buyer. The content of the message generated may be based at least in part on the level of confidence indicate by the confidence module 812 and/or the items and/or services identified by the order prediction module 810.

In some cases, the confidence module 812 may generate a confidence rating above a pre-purchase threshold (e.g., greater than 95% probability that the buyer will purchase the identified items and/or services). In other cases, the buyer may expressly authorize the service provider module 800 to place a purchase a particular item. In either of these cases, the payment processing and order placement module 816 may receive at least some transaction information from a buyer device, such as an amount of the transaction and authorization to charge a particular payment care, and the payment processing and order placement module 816 may verify that the particular payment card may be used to pay for the transaction, such as by contacting a card clearinghouse computing device or other bank computing device. Furthermore, in some examples, the payment processing module 816 may redirect payment information for transactions to be made using payment cards to a bank computing device, while in other examples, the merchant may communicate directly with an appropriate bank computing device for approving or denying a transaction using a particular payment card for a particular transaction.

In other cases, the confidence module 812 may generate a confidence rating below a pre-purchase threshold (e.g., less than 95% probability that the buyer will purchase the identified items and/or services) but above an order placement threshold (e.g., above 75% probability that the buyer will purchase the identified items and/or services). In these cases, the payment processing and order placement module 816 may place an order with one or more merchants on behalf of the buyer but refrain from transmitting payment information.

In the illustrated example, the order prediction module 810 and the confidence module 812 are shown as separate modules. However, it should be understood that in some implementations the order prediction module 810 and the confidence module 812 may be combined or further refined into any number of modules. For example, the order prediction module 810 may be configured to both identify regularly or habitually purchased items and/or services as well as to calculate the confidence rating.

The buyer information 818 and merchant information 820 may include buyer and/or merchant profiles as well as data related to the past purchasing history of individual buyers. The service provider may then make recommendations to the individual buyers, via a buyer device, offering to conduct or conclude a transaction with the merchant for items or services that the individual buyer regularly purchases based at least in part on an analysis of the buyer information and/or the merchant information.

In some cases, the buyer information 818 may be collected in part from the buyer devices and/or the buyer applications operating on the devices. For example, when a buyer accepts an order, selects a purchase or order virtual control, and/or selects a cancel virtual control, the purchase information (e.g., either order accepted, order purchased, or order canceled, price, tax, number and identification of items selected, merchant identification, merchant location, etc.) may be communicated to the service provider module 800 together with the time and date information for storing as buyer information 820. In other examples, the buyer applications may detect or receive information from other applications operating on the buyer devices and transmit the information received to the service provider module 802. For instance, the buyer may complete a purchase transaction using another application (e.g., an app store or online shopping application) and the purchase information may be received by the buyer application and communicated to the service provider module 802.

In other examples, the buyer information 818 and/or the merchant information 820 may be received from one or more of the merchants. For example, assume that a buyer is conducting a transaction with a merchant. The merchant may complete the transaction with the buyer at a POS device. For instance, the buyer may purchase one or more items using a payment card and the POS device may process the transaction with a financial institution associated with the payment card. In some cases, the POS device may have a merchant application 146 associated with the service provider module 802 installed. The merchant application 146 may be configured to detect a transaction associated with the buyer, for example by detecting that the payment was made by swiping a payment card having a card number associated with the buyer. Upon detection of a purchase associated with the buyer, the merchant application 146 may transmit the transaction information (e.g., amount paid, tax paid, number and identification of items purchased, merchant identification, merchant location, time and date of transaction, etc.) to the service provider module 802. Thus, the service provider module 802 is able to collect the buyer information 818 and the merchant information 820 and thereby, improve the accuracy associated with the order prediction module 810 and/or the confidence module 812.

Additional functional components stored in the computer-readable media 804 may include an operating system 822 for controlling and managing various functions of the service provider device 800 and/or other functional components and data, such as other modules and data 824, which may include programs, drivers, etc., and the data used or generated by the functional components. Further, the service provider device 800 may include many other logical, programmatic and physical components, of which those described above are merely examples that are related to the discussion herein.

The communication interface(s) 806 may include one or more interfaces and hardware components for enabling communication with various other devices, such as over the network(s) 116 and 144 of FIG. 1. For example, communication interface(s) 806 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The service provider device 800 may further be equipped with various input/output (I/O) devices 826. Such I/O devices 826 may include a display, various user interface controls (e.g., buttons, joystick, keyboard, mouse, touch screen, etc.), audio speakers, connection ports and so forth.

Figure 9:
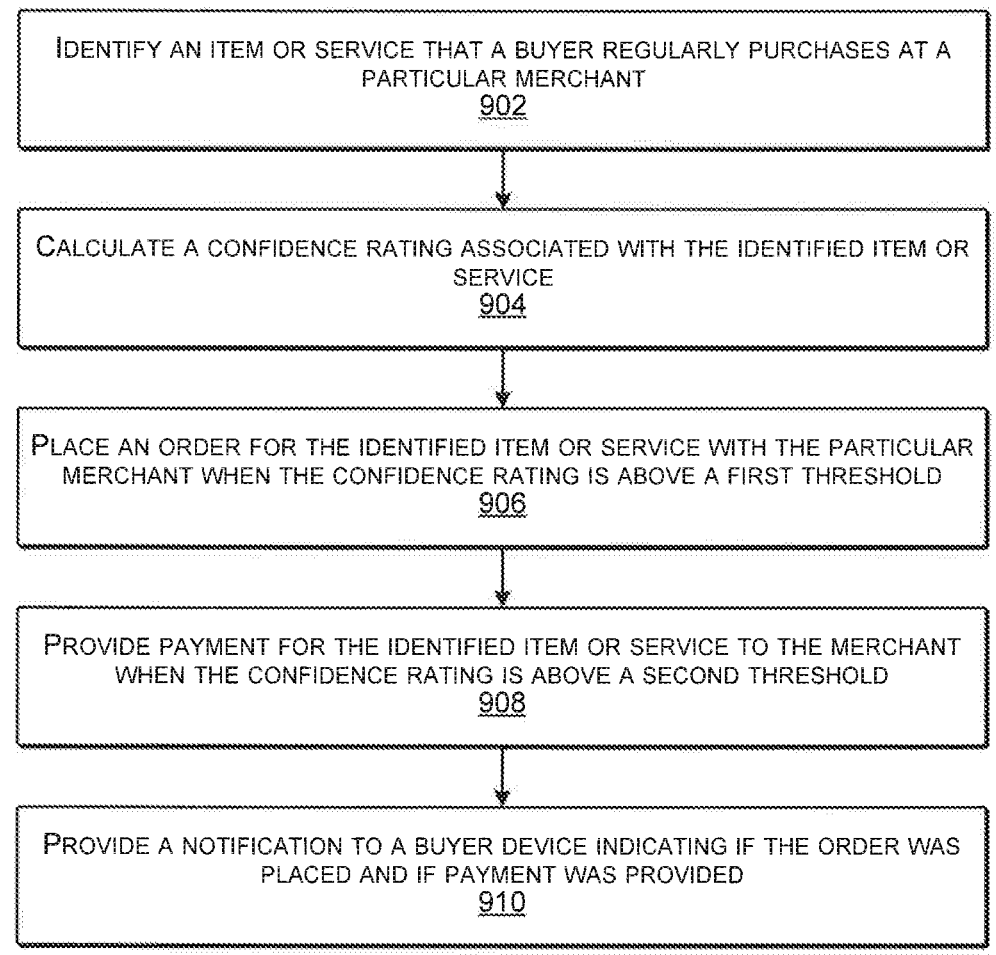
FIG. 9 is a flow diagram illustrating an example process for pre-ordering items on behalf of a buyer according to some implementations.

FIG. 9 is a flow diagram illustrating an example process for pre-ordering items on behalf of a buyer according to some implementations. The process of FIG. 9 is illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. Accordingly, in some implementations, the example process 900 of FIG. 9 may be executed by one or more processors associated with a service provider device and/or a service provider module.

At 902, a service provider module identifies an item that a buyer regularly purchases at a particular merchant. For example, as discussed above, an order prediction module of the service provider module may identify items and/or services regularly or habitually purchased by a buyer based on information collected about the buyer and/or about merchants that the buyer frequents.

At 904, the service provider module may calculate a confidence rating associated with the identified item. For example, the confidence rating may be a probably or likelihood that the buyer will purchase the identified item from the particular merchant at a given time. In some cases, the confidence rating may be calculated based in part on information known about the buyer and/or the merchant. For instance, the confidence rating may be based at least in part on a purchasing history associated with the buyer, an inventory or availability associated with the particular merchant, a time and/or date, location information associated with the buyer or one or more buyer devices, among others.

At 906, the service provider module places an order with the particular merchant for the identified item when the confidence rating is above a first threshold. For example, the service provider module may place the order when the confidence rating is about an order threshold or percentage. For example, the service provider module may place an order with the particular merchant when the confidence rating is above 75%.

At 908, the service provider module may provide payment for the identified item to the particular merchant when the confidence rating is above a second threshold. For example, if the confidence rating is above the first threshold (e.g., 75%) but below the second threshold (e.g., 95%), the service provider module may have sufficient confidence to place an order but insufficient confidence to pre-purchase the item on behalf of the buyer. Alternatively, when the confidence rating is also above the second threshold (e.g., greater than 95%), the service provider module may have sufficient confidence to both place the order and to tender payment to the particular merchant.

At 910, the service provider module provides a message to a buyer device. The message indicating that the order was placed and if payment was provided. For instance, in some situations, the confidence rating may be below the first threshold (e.g., 75%) but above a third threshold (e.g., 50%). In these situations, the service provider module may provide the message to the buyer device to query the buyer as to whether or not the buyer would like to place the order or purchase the identified item. In other instances, the message may include an indication that the identified item and/or service was ordered or purchased on behalf of the buyer.

Figure 10:
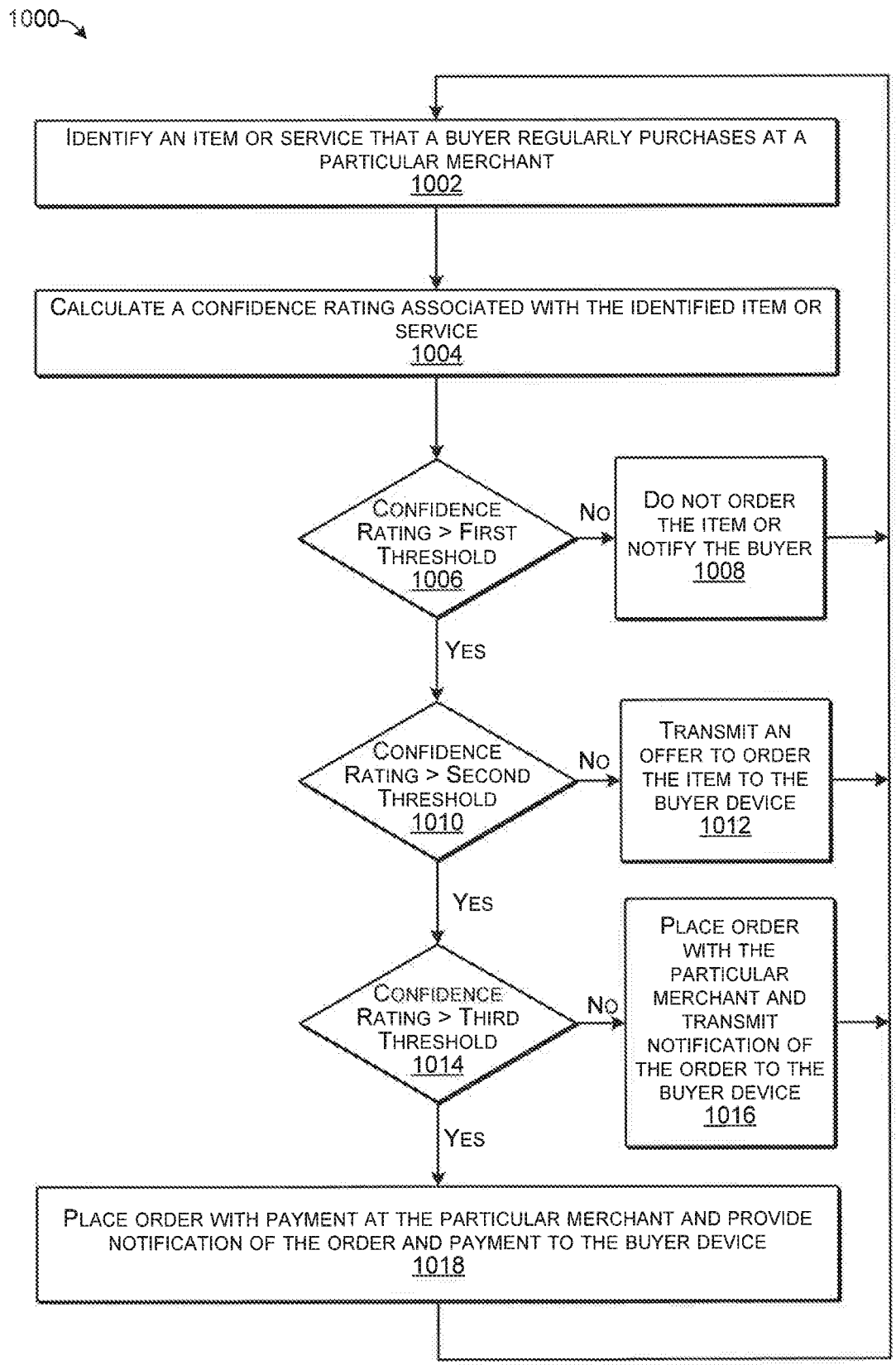
FIG. 10 is a flow diagram illustrating an example process for pre-ordering items on behalf of a buyer according to some implementations.

FIG. 10 is a flow diagram illustrating an example process for pre-ordering items on behalf of a buyer according to some implementations. For example, a service provider device or module may make recommendations, pre-purchase items or service, as well as complete transactions on behalf of one or more buyers for items regularly or habitually purchased by each of the one or more buyers.

At 1002, the service provider module identifies an item that a buyer regularly purchases at a particular merchant. For example, as discussed above, an order prediction module of the service provider module may identify items and/or services regularly or habitually purchased by a buyer based on information collected about the buyer and/or about merchants that the buyer frequents. In some cases, the service provider module may have access to data such as past purchasing history, location information, calendar information, etc. associated with the buyer and based on an analysis of the data identify the item.

At 1004, the service provider module may calculate a confidence rating associated with the identified item. For example, the confidence rating may be a probably or likelihood that the buyer will purchase the identified item from the particular merchant at a given time. In some cases, the confidence rating may be calculated based in part on the information known about the buyer and/or the merchant. For instance, the confidence rating may be based at least in part on the purchasing history associated with the buyer, an inventory or availability associated with the particular merchant, a time and/or date, location information associated with the buyer or one or more buyer devices, and various other factors, such as current weather conditions, current local events, and so forth. For example, the buyer may tend to buy a first item, such as hot coffee, when the weather is below a particular temperature, or when it is raining, and may tend to purchase iced coffee when it is sunny and above a particular temperature. In some examples, the confidence rating may be determined by one or more statistical models that have been trained using a large sampling of training data that indicates when buyers tend to make regular purchases and when buyers tend to stray from their regular purchases. The service provider module may obtain various types of information, such as weather, local events, and so forth, from online sources, or the like.

Furthermore, in some examples, the service provider module may user the purchasing habits of buyers that are similar to a particular buyer when determining the confidence rating. For instance, the service provider module may maintain a huge number of buyer profiles associated with different buyers, e.g., hundreds of thousands, millions, etc. From those buyer profiles, the service provider module may identify a subset of buyer profiles corresponding to buyers with buying habits and demographics similar to a particular buyer. Thus, the service provider module may use the buying habits of the subset of buyer profiles in addition to the buying habits of the particular buyer when determining the confidence rating as to whether the particular buyer will want to make a purchase of a particular item at a particular time on a particular day.

At 1006, the service provider module determines if the confidence rating is above a first threshold. For example, the first threshold may be a confidence level at which the service provider module is comfortable with reminding the buyer that it is time to purchase an item. Therefore, if the confidence rating is below the first threshold, the process 1000 proceeds to 1008 and the service provider module does not order the item or notify the buyer that it is time to order the item.

Alternatively, if the confidence rating is above the first threshold, the process 1000 proceeds to 1010 and the service provider module determines if the confidence rating is above a second threshold. For example, the second threshold may be a confidence level at which the service provider module is comfortable with pre-ordering the item on behalf of the buyer. Therefore, if the confidence rating is below the second threshold, the process 1000 proceeds to 1012 and the service provider module transmits an offer to order the item to the buyer device (e.g., the service provider module has enough confidence to remind the buyer to order the item but not enough to order the item on behalf of the buyer).

If, however, the confidence rating is above the second threshold, the process 1000 proceeds to 1014 and the service provider module determines if the confidence rating is above a third threshold. For example, the third threshold may be a confidence level at which the service provider module is comfortable with pre-purchasing or paying for the item on behalf of the buyer. Therefore, if the confidence rating is below the third threshold, the process 1000 proceeds to 1016 and the service provider module places an order with the particular merchant and transmits an message of the order to the buyer device.

Alternatively, if the confidence rating is above the third threshold, the process 1000 proceeds to 1018 and the service provider module places an order with payment at the particular merchant (e.g., buys the item on behalf of the buyer) and transmits a message of the order and payment to the buyer device. Thus, in this manner, the buyer is able to visit the merchant's establishment and pick up the item without waiting in line to pay. The process 1000, then returns to 1002 and the service provider module identifies another item that the buyer regularly purchases at a particular merchants Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A method of purchase-based prediction, the method comprising:
   receiving transaction information at a server and from at least one of a buyer device associated with a buyer or a point of sale (POS) device, the transaction information identifying a purchase associated with a first appointment made by the buyer using at least one of the buyer device and the POS device, the transaction information identifying a timing of the purchase;
   identifying, by the server and based on the purchase, a service provider at which to request a second appointment;
   identifying, by the server, a trend based on the timing of the purchase associated with the first appointment, wherein the trend is indicative of the buyer having had previous periodic appointments at regular intervals with the service provider;
   determining, by the server, a timing for the second appointment based at least on the trend;
   identifying an issue associated with the timing for the second appointment and with the service provider;
   determining, based on identifying the issue, a second service provider without the issue for the second appointment based on the timing for the second appointment and based on one or more similarities between the service provider and the second service provider;
   generating, by the server, an appointment record in a data store of the server, wherein generating the appointment record automatically schedules the second appointment with the second service provider on behalf of the buyer based on the timing for the second appointment via one or more communications between the server and a service provider computing device associated with the second service provider; and
   sending, by the server, a message to the buyer device confirming that the second appointment with the second service provider has been scheduled.

2. The method of claim 1, further comprising:
   sending a second message from the server to the buyer device, the second message offering to schedule the second appointment with the service provider on behalf of the buyer; and
   receiving a confirmation at the server from the buyer device, the confirmation confirming that the buyer approves of scheduling the second appointment with the service provider on behalf of the buyer.

3. The method of claim 1, further comprising:
   receiving, at the server, additional transaction information identifying that the buyer has made the purchase on at least one other occasion, with the timing the purchase on the at least one other occasion indicating that the purchase is routine.

4. The method of claim 1, wherein scheduling the second appointment with the service provider on behalf of the buyer is based on the first appointment being with the service provider and having been previously scheduled by the buyer at least once.

5. The method of claim 1, wherein the transaction information identifies that the purchase made by the buyer is from the service provider.

6. The method of claim 1, further comprising receiving a calendar of the buyer from the buyer device, wherein scheduling the second appointment with the second service provider on behalf of the buyer based on the timing is based on availability in the calendar of the buyer.

7. The method of claim 1, wherein the second appointment is a restaurant reservation.

8. The method of claim 1, wherein the second appointment is associated with an order for an item, where the item is scheduled to be ready for pickup at a time associated with the second appointment.

9. The method of claim 1, wherein the second appointment is for a block of time during which the buyer is to receive a service from the service provider.

10. A method of prediction, the method comprising:
receiving, at a server, information identifying a first appointment made for a customer and timing of the first appointment;
identifying, by the server and based on the first appointment, a service provider at which to request a second appointment;
identifying, by the server, a trend based on the timing of the first appointment, wherein the trend is indicative of the customer having had previous periodic appointments at regular intervals with the service provider;
determining, by the server, a timing for the second appointment based at least on the trend;
identifying an issue associated with the timing for the second appointment and with the service provider;
determining, based on identifying the issue, a second service provider without the issue for the second appointment based on the timing for the second appointment and based on one or more similarities between the service provider and the second service provider;
generating, by the server, an appointment record in a data store of the server, wherein generating the appointment record automatically schedules a second appointment with the second service provider on behalf of the customer based on the timing for the second appointment via one or more communications between the server and a service provider computing device associated with the second service provider; and
sending, by the server, a message to a customer device associated with the customer, the message confirming that the second appointment with the second service provider has been scheduled.

11. The method of claim 10, further comprising:
sending a second message from the server to the customer device, the second message offering to schedule the second appointment with the second service provider on behalf of the customer; and
receiving a confirmation at the server from the customer device, the confirmation confirming that the customer approves of scheduling the second appointment with the second service provider on behalf of the customer.

12. The method of claim 10, wherein the information identifies that the first appointment is one of a routine plurality of appointments for the customer.

13. The method of claim 10, wherein the information identifies that the first appointment is with the service provider.

14. The method of claim 10, further comprising receiving a calendar of the customer from the customer device, wherein scheduling the second appointment with the second service provider on behalf of the customer based on the timing is based on availability in the calendar of the customer.

15. A system for prediction, the system comprising:
a network communication interface;
a memory storing instructions; and
a processor, wherein execution of the instructions by the processor causes the processor to:
receive, via the network communication interface, transaction information identifying a transaction associated with a first appointment and involving a customer, the transaction information identifying a timing of the transaction,
identify, based on the transaction, a service provider at which to request a second appointment,
identify a trend based on the timing of the transaction associated with the first appointment, wherein the trend is indicative of the customer having had previous periodic appointments at regular intervals with the service provider,
determine a timing for the second appointment based at least on the trend,
identify an issue associated with the timing for the second appointment and with the service provider,
determine, based on identifying the issue, a second service provider without the issue for the second appointment based on the timing for the second appointment and based on one or more similarities between the service provider and the second service provider,
generating an appointment record in a data store, wherein generating the appointment record automatically schedules the second appointment with the second service provider on behalf of the customer based on the timing for the second appointment via one or more communications between the network communication interface and a service provider computing device associated with the second service provider, and
send a message to a customer device associated with the customer via the network communication interface, the message confirming that the second appointment with the second service provider has been scheduled.

16. The system of claim 15, wherein execution of the instructions by the processor causes the processor to further:
send a second message to the customer device via the network communication interface, the second message offering to schedule the second appointment with the service provider on behalf of the customer; and
receiving a confirmation from the customer device via the network communication interface, the confirmation confirming that the customer approves of scheduling the second appointment with the service provider on behalf of the customer.

17. The system of claim 15, wherein the transaction information identifies that the transaction is between the customer and the service provider.

18. The system of claim 15, wherein the transaction information identifies that the transaction is one of a routine plurality of transactions.

* * * * *